(12) United States Patent
Inoshita et al.

(10) Patent No.: US 10,669,961 B2
(45) Date of Patent: Jun. 2, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Kenji Inoshita, Okazaki (JP); Shogo Tanaka, Toki (JP); Norihisa Nakagawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 43 days.

(21) Appl. No.: 16/170,410

(22) Filed: Oct. 25, 2018

(65) Prior Publication Data
US 2019/0136778 A1 May 9, 2019

(30) Foreign Application Priority Data
Nov. 8, 2017 (JP) .................. 2017-215880

(51) Int. Cl.
*F02D 41/02* (2006.01)
*F02D 41/14* (2006.01)
*F01N 3/10* (2006.01)
*F01N 11/00* (2006.01)

(52) U.S. Cl.
CPC ......... *F02D 41/0295* (2013.01); *F01N 3/101* (2013.01); *F01N 11/007* (2013.01); *F02D 41/1441* (2013.01); *F02D 41/1456* (2013.01); *F01N 2550/02* (2013.01); *F01N 2560/025* (2013.01); *F02D 2200/0814* (2013.01)

(58) Field of Classification Search
CPC combination set(s) only.
See application file for complete search history.

(56) References Cited

U.S. PATENT DOCUMENTS

| 6,718,754 | B2* | 4/2004 | Kobayashi | .............. | F01N 11/00 |
| | | | | | 60/276 |
| 8,234,853 | B2* | 8/2012 | Kamoto | .................. | F01N 3/101 |
| | | | | | 60/274 |
| 9,599,006 | B2* | 3/2017 | Genslak | .................. | F01N 3/101 |
| 9,670,819 | B2* | 6/2017 | Aoki | .................... | F02D 41/0235 |

(Continued)

FOREIGN PATENT DOCUMENTS

JP 2015-222046 12/2015
JP 2017-031946 2/2017

*Primary Examiner* — Binh Q Tran
(74) *Attorney, Agent, or Firm* — Finnegan, Henderson, Farabow, Garrett & Dunner, LLP

(57) ABSTRACT

An exhaust purification system of an internal combustion engine comprises an air-fuel ratio control device controlling an air-fuel ratio of the inflowing exhaust gas to a target air-fuel ratio. If a first judged condition wherein an estimated amount of change of an oxygen storage amount of the catalyst when the target air-fuel ratio is maintained at the first set air-fuel ratio is equal to or greater than a first reference amount, and a second judged condition wherein a difference of an air-fuel ratio detected by the upstream side air-fuel ratio sensor and a stoichiometric air-fuel ratio is equal to or greater than a difference of a second judged air-fuel ratio and a stoichiometric air-fuel ratio are satisfied, the air-fuel ratio control device switches the target air-fuel ratio from the first set air-fuel ratio to the second set air-fuel ratio when the first judged condition and second judged condition are satisfied.

6 Claims, 11 Drawing Sheets

(56) References Cited

U.S. PATENT DOCUMENTS

| | | | |
|---|---|---|---|
| 10,087,864 B2 * | 10/2018 | Nakagawa | F01N 3/101 |
| 2008/0245057 A1 * | 10/2008 | Odendall | F01N 11/007 |
| | | | 60/276 |
| 2017/0037802 A1 | 2/2017 | Okabe et al. | |
| 2017/0101950 A1 | 4/2017 | Nakagawa et al. | |

* cited by examiner

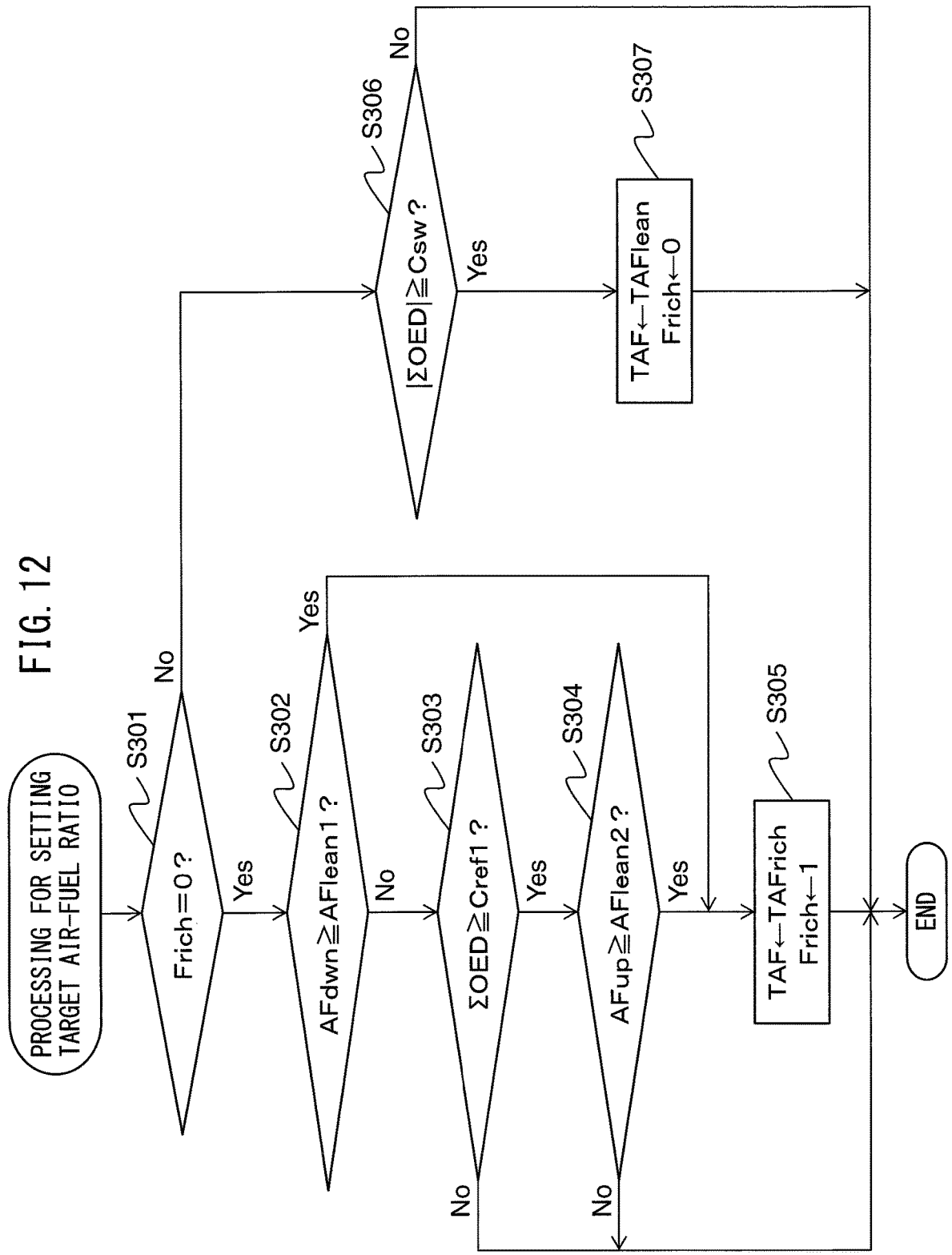

EXHAUST PURIFICATION SYSTEM OF INTERNAL COMBUSTION ENGINE

FIELD

The present invention relates to an exhaust purification system of an internal combustion engine.

BACKGROUND

It has been known in the past to arrange a catalyst able to store oxygen in an exhaust passage of an internal combustion engine and to remove unburned gas (HC, CO, etc.) and $NO_X$ in the exhaust gas at the catalyst. The higher the oxygen storage ability of the catalyst, the greater the amount of oxygen able to be stored at the catalyst and the more the exhaust purification performance of the catalyst is improved.

To maintain the oxygen storage ability of the catalyst, it is preferable to make the oxygen storage amount of the catalyst fluctuate so that the oxygen storage amount of the catalyst is maintained constant. In the internal combustion engine described in PTL 1, to make the oxygen storage amount of the catalyst fluctuate, the target air-fuel ratio of the exhaust gas flowing into the catalyst is alternately switched between a lean air-fuel ratio leaner than a stoichiometric air-fuel ratio and a rich air-fuel ratio richer than a stoichiometric air-fuel ratio based on an output of a downstream side air-fuel ratio sensor arranged at a downstream side of the catalyst in the direction of flow of exhaust.

Specifically, when the air-fuel ratio detected by the downstream side air-fuel ratio sensor becomes a rich judged air-fuel ratio richer than a stoichiometric air-fuel ratio or becomes less, the target air-fuel ratio is set to the lean air-fuel ratio, while, when the air-fuel ratio detected by the downstream side air-fuel ratio sensor becomes a lean judged air-fuel ratio leaner than a stoichiometric air-fuel ratio or becomes more, the target air-fuel ratio is set to the rich air-fuel ratio.

CITATION LIST

Patent Literature

[PTL 1] Japanese Patent Publication No. 2015-222046A

SUMMARY

Technical Problem

In this regard, at the time of acceleration or deceleration etc., of a vehicle mounting an internal combustion engine, sometimes the air-fuel ratio of the exhaust gas flowing into the catalyst will temporarily deviate from the target air-fuel ratio due to an external disturbance. If the air-fuel ratio of the exhaust gas flowing into the catalyst deviates to the rich side from the target air-fuel ratio, the unburned gas flowing into the catalyst will become greater. For this reason, when the oxygen storage amount of the catalyst is close to zero, a large amount of unburned gas is liable to flow out from the catalyst if the air-fuel ratio of the exhaust gas flowing into the catalyst deviates to the rich side from the target air-fuel ratio.

On the other hand, if the air-fuel ratio of the exhaust gas flowing into the catalyst deviates to the lean side from the target air-fuel ratio, the amounts of oxygen and $NO_X$ flowing into the catalyst will become greater. For this reason, when the oxygen storage amount of the catalyst is close to the maximum oxygen storage amount, a large amount of $NO_X$ is liable to flow out from the catalyst if the air-fuel ratio of the exhaust gas flowing into the catalyst deviates to the lean side from the target air-fuel ratio.

Therefore, in view of the above problem, an object of the present invention is to keep the exhaust emission from deteriorating when making the oxygen storage amount of the catalyst fluctuate in an internal combustion engine.

Solution to Problem

The summary of the present disclosure is as follows.

(1) An exhaust purification system of an internal combustion engine comprising: a catalyst arranged in an exhaust passage and able to store oxygen; an upstream side air-fuel ratio sensor arranged at an upstream side of the catalyst in a direction of flow of exhaust and detecting an air-fuel ratio of inflowing exhaust gas flowing into the catalyst; a downstream side air-fuel ratio sensor arranged at a downstream side of the catalyst in the direction of flow of exhaust and detecting an air-fuel ratio of outflowing exhaust gas flowing out from the catalyst; and an air-fuel ratio control device configured to control an air-fuel ratio of the inflowing exhaust gas to a target air-fuel ratio, wherein the air-fuel ratio control device is configured to set the target air-fuel ratio to a first set air-fuel ratio, then, when the air-fuel ratio detected by the downstream side air-fuel ratio sensor reaches a first judged air-fuel ratio, switch the target air-fuel ratio from the first set air-fuel ratio to a second set air-fuel ratio, the first set air-fuel ratio and the first judged air-fuel ratio are air-fuel ratios in a first region richer or leaner than a stoichiometric air-fuel ratio, a difference of the first set air-fuel ratio and stoichiometric air-fuel ratio is larger than a difference of the first judged air-fuel ratio and stoichiometric air-fuel ratio, and the second set air-fuel ratio is an air-fuel ratio in a second region at an opposite side to the first region across the stoichiometric air-fuel ratio, if a first judged condition wherein an estimated amount of change of an oxygen storage amount of the catalyst when the target air-fuel ratio is maintained at the first set air-fuel ratio is equal to or greater than a first reference amount, and a second judged condition wherein a difference of an air-fuel ratio detected by the upstream side air-fuel ratio sensor and a stoichiometric air-fuel ratio is equal to or greater than a difference of a second judged air-fuel ratio and a stoichiometric air-fuel ratio are satisfied, the air-fuel ratio control device is configured to switch the target air-fuel ratio from the first set air-fuel ratio to the second set air-fuel ratio when the first judged condition and second judged condition are satisfied, and the first reference amount is smaller than a maximum oxygen storage amount of the catalyst, the second judged air-fuel ratio is an air-fuel ratio in the first region, and a difference of the second judged air-fuel ratio and the stoichiometric air-fuel ratio is larger than a difference of the first set air-fuel ratio and the stoichiometric air-fuel ratio.

(2) The exhaust purification system of an internal combustion engine described in above (1), wherein the air-fuel ratio control device is configured to switch the target air-fuel ratio from the second set air-fuel ratio to the first set air-fuel ratio when the air-fuel ratio detected by the downstream side air-fuel ratio sensor reaches a third judged air-fuel ratio, and if a third judged condition wherein the estimated amount of change of the oxygen storage amount of the catalyst when the target air-fuel ratio is maintained at the second set air-fuel ratio is equal to or greater than a second reference amount, and a fourth judged condition wherein a difference of the air-fuel ratio detected by the upstream side air-fuel ratio sensor and the stoichiometric air-fuel ratio is equal to or greater than a difference of the fourth judged air-fuel ratio and the stoichiometric air-fuel ratio are satisfied, the air-fuel ratio control device is configured to switch the target air-fuel ratio from the second set air-fuel ratio to the first set air-fuel ratio when the third judged condition and the fourth judged condition are satisfied, and the second reference amount is smaller than a maximum oxygen storage amount of the catalyst, the fourth judged air-fuel ratio is an air-fuel ratio in the second region, and a difference of the fourth judged air-fuel ratio and a stoichiometric air-fuel ratio is larger than a difference of the second set air-fuel ratio and the stoichiometric air-fuel ratio.

(3) The exhaust purification system of an internal combustion engine described in above (1), wherein the air-fuel ratio control device is configured to switch the target air-fuel ratio from the second set air-fuel ratio to the first set air-fuel ratio when the estimated amount of change of the oxygen storage amount of the catalyst when the target air-fuel ratio is maintained at the second set air-fuel ratio reaches a switching storage amount and the switching storage amount is smaller than of a maximum oxygen storage amount of the catalyst and larger than the first reference amount.

(4) The exhaust purification system of an internal combustion engine described in any one of above (1) to (3), wherein the air-fuel ratio control device is configured to control by feedback an amount of fuel supplied to a combustion chamber so that the air-fuel ratio detected by the upstream side air-fuel ratio sensor matches the target air-fuel ratio, and calculate the estimated amount of change of the oxygen storage amount of the catalyst based on the air-fuel ratio detected by the upstream side air-fuel ratio sensor.

Advantageous Effects of Invention

According to the present invention, it is possible to keep the exhaust emission from deteriorating when making the oxygen storage amount of the catalyst fluctuate in an internal combustion engine.

BRIEF DESCRIPTION OF DRAWINGS

FIG. 12 is a flow chart showing a control routine of processing for setting a target air-fuel ratio in the third embodiment.

DESCRIPTION OF EMBODIMENTS

Figure 1:
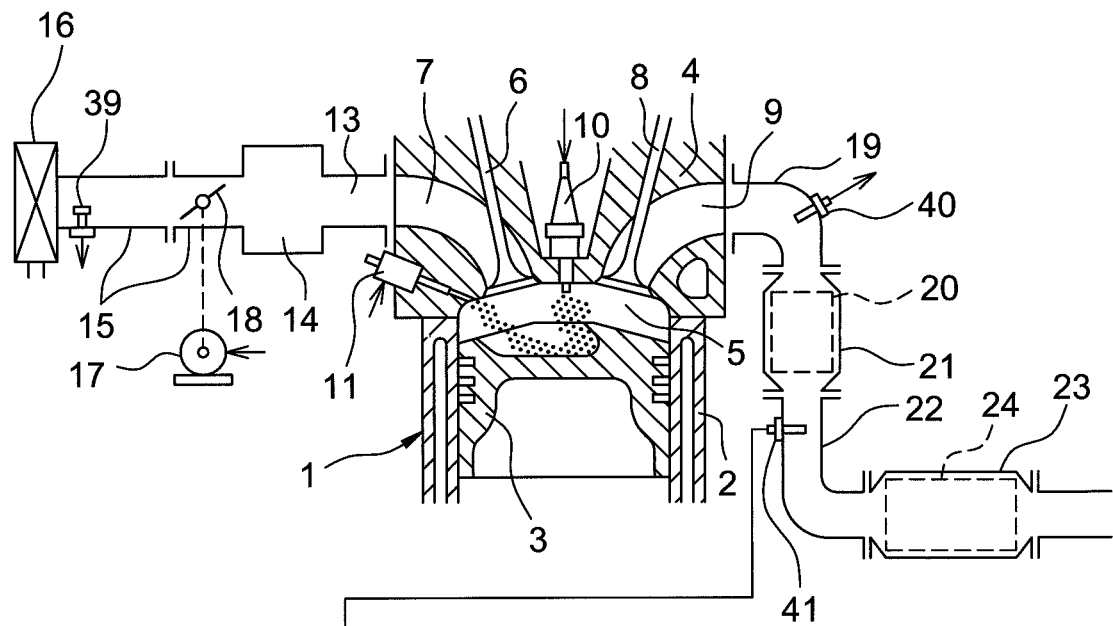
FIG. 1 is a view schematically showing an internal combustion engine provided with an exhaust purification system of an internal combustion engine according to a first embodiment of the present invention.
Figure 1:
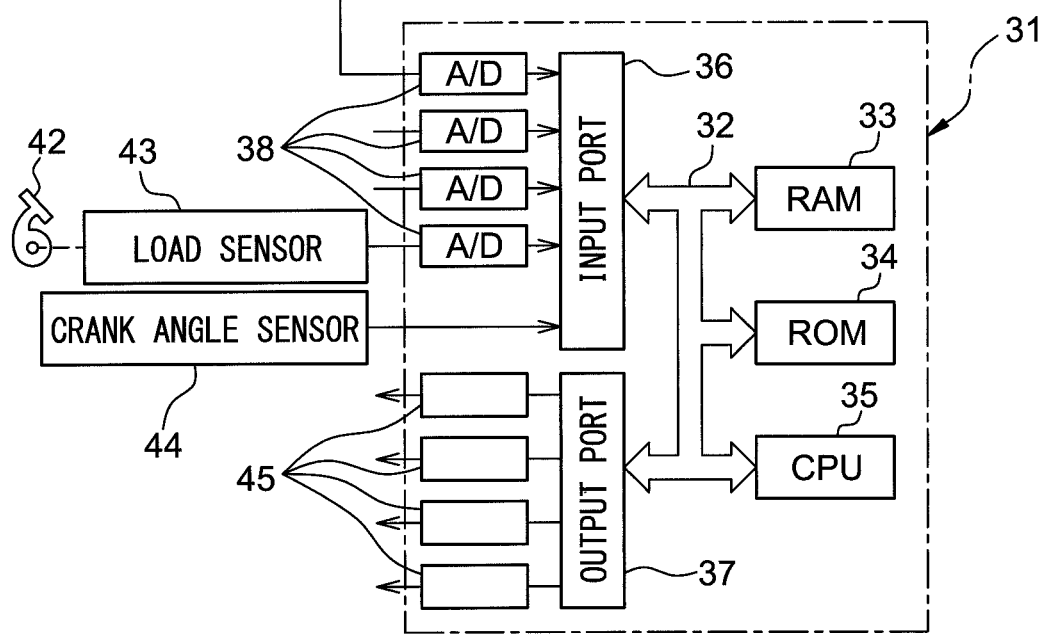

Below, referring to the figures, embodiments of the present invention will be explained in detail. Note that, in the following explanation, similar components are assigned the same reference numerals.

First Embodiment

First, referring to FIG. 1 to FIG. 8, a first embodiment of the present invention will be explained.

<Explanation of Internal Combustion Engine Overall>

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

Various control routines of the internal combustion engine are performed by an electronic control unit (ECU) 31. The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 detecting the flow rate of air which flows through the intake pipe 15 is arranged. The output of the air flow meter 39 is input through a corresponding AD converter 38 to the input port 36.

Further, at the header of the exhaust manifold 19, i.e., a upstream side of the upstream side catalyst 20 in the direction of flow of exhaust, an upstream side air-fuel ratio sensor 40 detecting the air-fuel ratio of the exhaust gas which flows through the inside of the exhaust manifold 19 (that is, the exhaust gas which flows into the upstream side catalyst 20) is arranged. The output of the upstream air-fuel ratio sensor 40 is input through the corresponding AD converter 38 to the input port 36.

Further, inside the exhaust pipe 22, that is, at the downstream side of the upstream side catalyst 20 in the direction of flow of exhaust, a downstream side air-fuel ratio sensor 41 for detecting an air-fuel ratio of the exhaust gas flowing through the inside of the exhaust pipe 22 (that is, exhaust gas flowing out from the upstream side catalyst 20) is arranged. The output of the downstream side air-fuel ratio sensor 41 is input through a corresponding AD converter 38 to the input port 36.

Further, an accelerator pedal 42 is connected to a load sensor 43 generating an output voltage proportional to the amount of depression of the accelerator pedal 42. The output voltage of the load sensor 43 is input through a corresponding AD converter 38 to the input port 36. A crank angle sensor 44 generates an output pulse every time the crankshaft rotates, for example, by 15 degrees. This output pulse is input to the input port 36. In the CPU 35, the engine speed is calculated from the output pulse of the crank angle sensor 44. On the other hand, the output port 37 is connected through corresponding drive circuits 45 to the spark plugs 10, fuel injectors 11, and the throttle valve drive actuator 17.

Note that, the above-mentioned internal combustion engine is a nonsupercharged internal combustion engine fueled by gasoline, but the configuration of the internal combustion engine is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine may differ from the configuration shown in FIG. 1. For example, the fuel injectors 11 may be arranged to inject fuel into the intake ports 7.

<Explanation of Catalysts>

The upstream side catalyst 20 and the downstream side catalyst 24 arranged in the exhaust passage have similar configurations. The catalysts 20 and 24 are catalysts having oxygen storage abilities, for example, three-way catalysts. Specifically, the catalysts 20 and 24 are comprised of carriers made of ceramic on which a precious metal having a catalytic action (for example, platinum (Pt)) and a co-catalyst having an oxygen storage ability (for example, ceria ($CeO_2$)) are carried.

Figure 2:
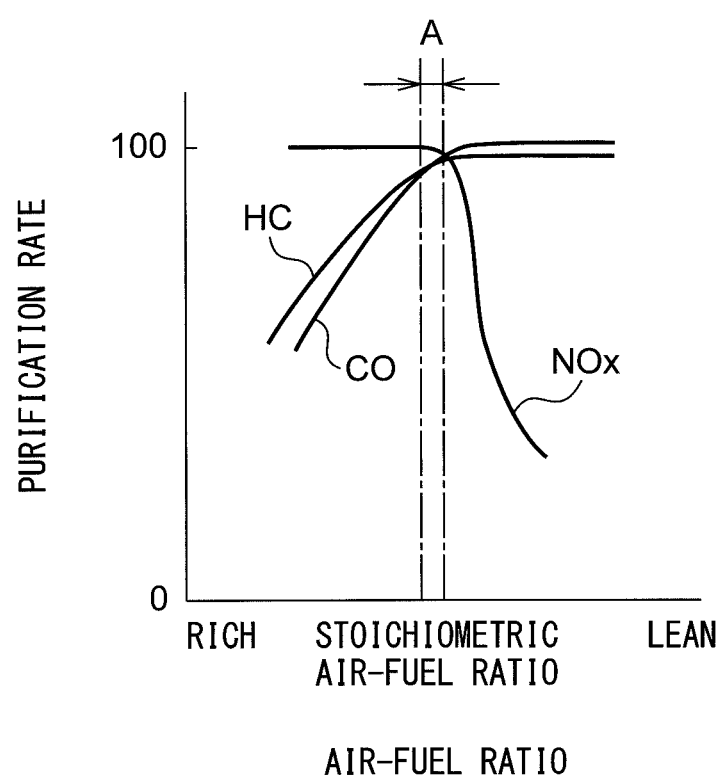
FIG. 2 shows purification characteristics of a three-way catalyst.

FIG. 2 shows the purification characteristics of a three-way catalyst. As shown in FIG. 2, the purification rates of unburned gas (HC, CO) and nitrogen oxides ($NO_X$) by the catalysts 20 and 24 become extremely high when the air-fuel ratio of the exhaust gas flowing into the catalysts 20 and 24 is in the region near the stoichiometric air-fuel ratio (purification window A in FIG. 2). Therefore, the catalysts 20 and 24 can effectively remove unburned gas and $NO_X$ if the air-fuel ratio of the exhaust gas is maintained at the stoichiometric air-fuel ratio.

Further, the catalysts 20 and 24 store or release oxygen in accordance with the air-fuel ratio of the exhaust gas by the co-catalyst. Specifically, the catalysts 20 and 24 store excess oxygen in the exhaust gas when the air-fuel ratio of the exhaust gas is leaner than the stoichiometric air-fuel ratio. On the other hand, the catalysts 20 and 24 release the amount of additional oxygen required for making the unburned gas oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalysts 20 and 24 is maintained near the stoichiometric air-fuel ratio and the unburned gas and NOx are effectively removed at the catalysts 20 and 24.

Note that, so long as the catalysts 20 and 24 have catalytic actions and oxygen storage abilities, they may be catalysts other than three-way catalysts.

<Output Characteristics of Air-Fuel Ratio Sensors>

Figure 3:
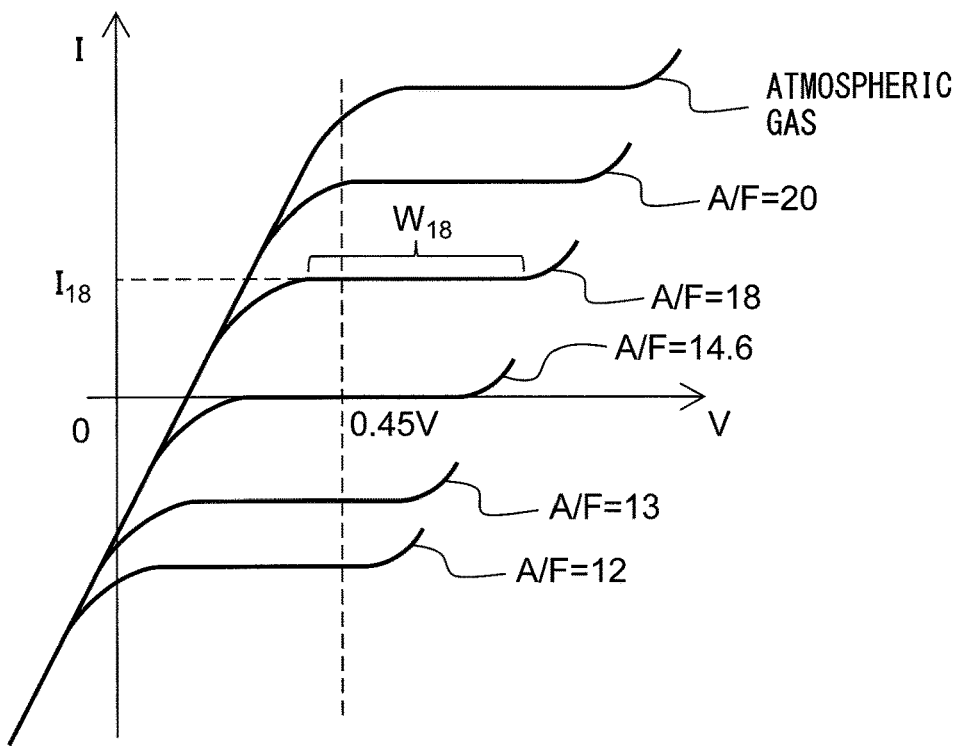
FIG. 3 is a view showing a relationship of a sensor applied voltage and output current at different exhaust air-fuel ratios.
Figure 4:
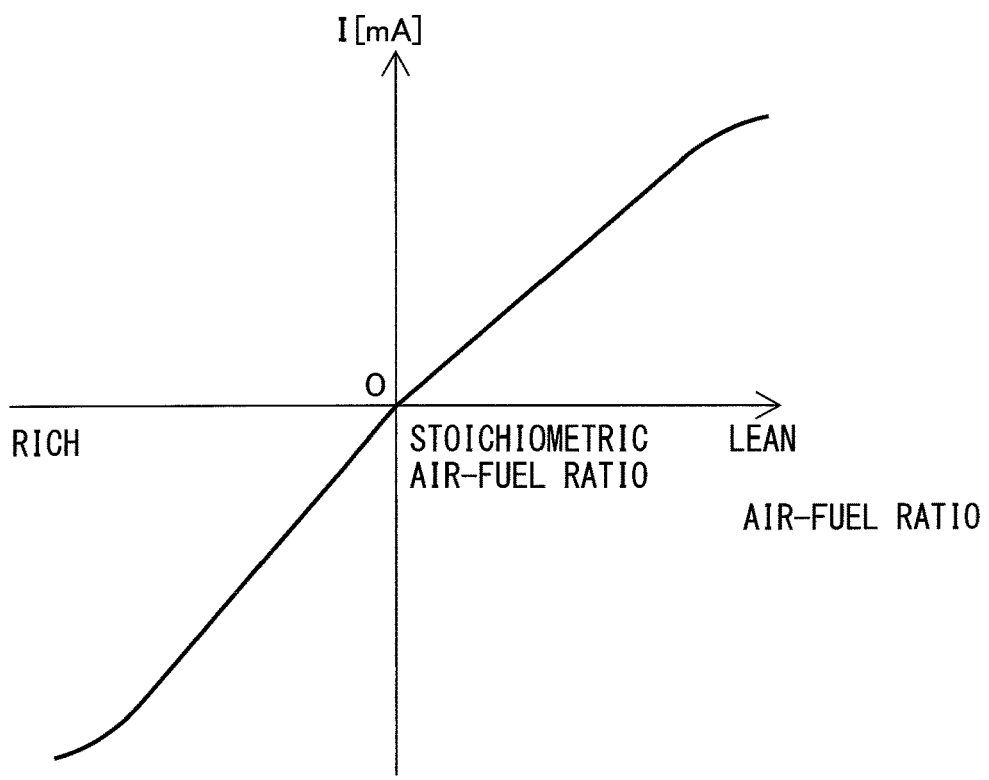
FIG. 4 is a view showing a relationship of an exhaust air-fuel ratio and output current when making a sensor applied voltage constant.

Next, referring to FIG. 3 and FIG. 4, the output characteristics of the air-fuel ratio sensors 40, 41 in the present embodiment will be explained. FIG. 3 is a view showing the voltage-current (V-I) characteristics of the air-fuel ratio sensors 40, 41 in the present embodiment, while FIG. 4 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 3, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 3, the limit current region and the limit current when the exhaust air-fuel ratio is 18 are respectively shown by $W_{18}$ and $I_{18}$. Therefore, the air-fuel ratio sensors 40, 41 are limit current type air-fuel ratio sensors.

FIG. 4 is a view showing the relationship between the exhaust air-fuel ratio and the output current I when making the applied voltage 0.45V or so. As will be understood from FIG. 4, in the air-fuel ratio sensors 40, 41, the higher the exhaust air-fuel ratio (that is, the leaner), the greater the output current I of the air-fuel ratio sensors 40, 41 becomes. In addition, the air-fuel ratio sensors 40, 41 are configured so that the output current I becomes zero when the exhaust air-fuel ratio is the stoichiometric air-fuel ratio. Accordingly, the air-fuel ratio sensors 40, 41 can continuously (linearly) detect the exhaust air-fuel ratio. Note that, when the exhaust air-fuel ratio becomes larger by a certain extent or more or when it becomes smaller by a certain extent or less, the ratio of the change of the output current with respect to the change of the exhaust air-fuel ratio becomes smaller.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may be air-fuel ratio sensors of structures different from each other.

<Exhaust Purification System of Internal Combustion Engine>

Below, an exhaust purification system of an internal combustion engine according to a first embodiment of the present invention (below, simply referred to as the "exhaust purification system") will be explained. The exhaust purification system comprises an upstream side catalyst 20, downstream side catalyst 24, upstream side air-fuel ratio sensor 40, downstream side air-fuel ratio sensor 41, and air-fuel ratio control device. In the present embodiment, the ECU 31 functions as the air-fuel ratio control device.

The air-fuel ratio control device controls the air-fuel ratio of the exhaust gas flowing into the upstream side catalyst 20 (below, referred to as the "inflowing exhaust gas") to a target air-fuel ratio. Specifically, the air-fuel ratio control device sets the target air-fuel ratio of the inflowing exhaust gas and controls the amount of fuel supplied to the combustion chambers 5 so that the air-fuel ratio of the inflowing exhaust gas matches the target air-fuel ratio. In the present embodiment, the air-fuel ratio control device controls by feedback the amount of fuel supplied to the combustion chambers 5 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor, that is, the air-fuel ratio detected by the air-fuel ratio sensor.

Further, the air-fuel ratio control device may, without using the upstream side air-fuel ratio sensor 40, control the amount of fuel supplied to the combustion chambers 5 so that the air-fuel ratio of the inflowing exhaust gas matches the target air-fuel ratio. In this case, the air-fuel ratio control device supplies the combustion chambers 5 with the amount of fuel calculated from the intake air amount detected by the air flow meter 39 and the target air-fuel ratio so that the ratio of the fuel and air supplied to the combustion chambers 5 matches the target air-fuel ratio.

The air-fuel ratio control device makes the oxygen storage amount of the upstream side catalyst 20 fluctuate so as to keep the oxygen storage ability of the upstream side catalyst 20 from falling by alternately switching the target air-fuel ratio of the inflowing exhaust gas between an air-fuel ratio richer than the stoichiometric air-fuel ratio and an air-fuel ratio leaner than the stoichiometric air-fuel ratio. Specifically, the air-fuel ratio control device switches the target air-fuel ratio from a rich set air-fuel ratio to a lean set air-fuel ratio when the output air-fuel ratio of the downstream side air-fuel ratio sensor 41 reaches a first rich judged air-fuel ratio and switches the target air-fuel ratio from the lean set air-fuel ratio to the rich set air-fuel ratio when the output air-fuel ratio of the downstream side air-fuel ratio sensor 41 reaches a first lean judged air-fuel ratio. Due to this, in the present embodiment, it is fluctuate the oxygen storage amount of the upstream catalyst 20 between zero and the maximum value.

The rich set air-fuel ratio and first rich judged air-fuel ratio are preset and are air-fuel ratios richer than the stoichiometric air-fuel ratio (in the present embodiment, 14.6). Further, the rich set air-fuel ratio is richer than the first rich judged air-fuel ratio. That is, the rich degree of the rich set air-fuel ratio is larger than the rich degree of the first rich judged air-fuel ratio. Note that, the "rich degree" means the difference between an air-fuel ratio richer than the stoichiometric air-fuel ratio and the stoichiometric air-fuel ratio.

The lean set air-fuel ratio and first lean judged air-fuel ratio are preset and are air-fuel ratios leaner than the stoichiometric air-fuel ratio. Further, the lean set air-fuel ratio is leaner than the first lean judged air-fuel ratio. That is, the lean degree of the lean set air-fuel ratio is larger than the lean degree of the first lean judged air-fuel ratio. Note that, the "lean degree" means the difference between an air-fuel ratio leaner than the stoichiometric air-fuel ratio and the stoichiometric air-fuel ratio.

The first rich judged air-fuel ratio is set to an air-fuel ratio corresponding to the output of the downstream side air-fuel ratio sensor 41 when the oxygen storage amount of the upstream side catalyst 20 decreases and the atmosphere of the upstream side catalyst 20 changes from the stoichiometric air-fuel ratio to rich. On the other hand, the first lean judged air-fuel ratio is set to an air-fuel ratio corresponding to the output of the downstream side air-fuel ratio sensor 41 when the oxygen storage amount of the upstream side catalyst 20 increases and the atmosphere of the upstream side catalyst 20 changes from the stoichiometric air-fuel ratio to lean. Therefore, when the output air-fuel ratio of the downstream side air-fuel ratio sensor 41 is between the first rich judged air-fuel ratio and the first lean judged air-fuel ratio, it is judged that the atmosphere of the upstream side catalyst 20 is the stoichiometric air-fuel ratio.

In this regard, at the time of acceleration or deceleration etc., of the vehicle mounting the internal combustion engine, sometimes the air-fuel ratio of the inflowing exhaust gas will temporarily deviate from the target air-fuel ratio due to external disturbance. If the air-fuel ratio of the inflowing exhaust gas deviates to the rich side from the target air-fuel ratio, the unburned gas flowing into the upstream side catalyst 20 will become greater. For this reason, when the oxygen storage amount of the upstream side catalyst 20 approaches zero, a large amount of unburned gas is liable to flow out from the upstream side catalyst 20 if the air-fuel ratio of the inflowing exhaust gas deviates to the rich side from the target air-fuel ratio.

On the other hand, when the oxygen storage amount of the upstream side catalyst 20 is sufficiently larger than zero, even if the air-fuel ratio of the inflowing exhaust gas deviates to the rich side from the target air-fuel ratio, there is little possibility of the oxygen storage amount of the upstream side catalyst 20 reaching zero. Further, if the air-fuel ratio of the inflowing exhaust gas deviates to the rich side from the target air-fuel ratio due to the external disturbance, the output air-fuel ratio of the upstream side air-fuel ratio sensor 40 will also deviate to the rich side from the target air-fuel ratio.

For this reason, in the present embodiment, if a first condition wherein an estimated amount of change of the oxygen storage amount of the upstream side catalyst 20 when the target air-fuel ratio is maintained at a rich set air-fuel ratio is equal to or greater than a rich side reference amount, and a second condition wherein a difference of the output air-fuel ratio of the upstream side air-fuel ratio sensor 40 and a stoichiometric air-fuel ratio is equal to or greater than a difference of a second rich judged air-fuel ratio and a stoichiometric air-fuel ratio are satisfied, the air-fuel ratio control device switches the target air-fuel ratio from the rich set air-fuel ratio to the lean set air-fuel ratio when the first condition and the second condition are satisfied. Note that, the second condition is satisfied when the output air-fuel ratio of the upstream side air-fuel ratio sensor 40 is equal to or less than the second rich judged air-fuel ratio.

The second rich judged air-fuel ratio is predetermined and is an air-fuel ratio richer than a stoichiometric air-fuel ratio. Further, the second rich judged air-fuel ratio is richer than a rich set air-fuel ratio. That is, the rich degree of the second rich judged air-fuel ratio is larger than the rich degree of the rich set air-fuel ratio. The rich side reference amount is predetermined and is set to a value smaller than the maximum oxygen storage amount of the upstream side catalyst 20.

Further, if the air-fuel ratio of the inflowing exhaust gas deviates to the lean side from the target air-fuel ratio, the amounts of oxygen and $NO_X$ flowing into the upstream side catalyst 20 become greater. For this reason, when the oxygen storage amount of the upstream side catalyst 20 is close to the maximum oxygen storage amount, a large amount of $NO_X$ is liable to flow out from the upstream side catalyst 20 if the air-fuel ratio of the inflowing exhaust gas deviates to the lean side from the target air-fuel ratio.

On the other hand, when the oxygen storage amount of the upstream side catalyst 20 is sufficiently smaller than the maximum oxygen storage amount, even if the air-fuel ratio of the inflowing exhaust gas deviates to the lean side from the target air-fuel ratio, there is little possibility of the oxygen storage amount of the upstream side catalyst 20 reaching the maximum oxygen storage amount. Further, if the air-fuel ratio of the inflowing exhaust gas deviates to the lean side from the target air-fuel ratio due to an external disturbance, the output air-fuel ratio of the upstream side air-fuel ratio sensor 40 also deviates to the lean side from the target air-fuel ratio.

For this reason, in the present embodiment, if a third condition wherein an estimated amount of change of the oxygen storage amount of the upstream side catalyst 20 when the target air-fuel ratio is maintained at the lean set air-fuel ratio is equal to or greater than a lean side reference amount, and a fourth condition wherein a difference of the output air-fuel ratio of the upstream side air-fuel ratio sensor 40 and a stoichiometric air-fuel ratio is equal to or greater than a difference of a second lean judged air-fuel ratio and a stoichiometric air-fuel ratio are satisfied, the air-fuel ratio control device switches the target air-fuel ratio from the lean set air-fuel ratio to the rich set air-fuel ratio when the third condition and the fourth condition are satisfied. Note that, the fourth condition is satisfied when the output air-fuel ratio of the upstream side air-fuel ratio sensor 40 is equal to or greater than the second lean judged air-fuel ratio.

The second lean judged air-fuel ratio is preset and is an air-fuel ratio leaner than the stoichiometric air-fuel ratio. Further, the second lean judged air-fuel ratio is leaner than the lean set air-fuel ratio. That is, the lean degree of the second lean judged air-fuel ratio is larger than the lean degree of the lean set air-fuel ratio. The lean side reference amount is preset and is set to a value smaller than the maximum oxygen storage amount of the upstream side catalyst 20. Note that, the lean side reference amount may be a value the same as the rich side reference amount or a value different from it.

The air-fuel ratio control device cumulatively adds the oxygen excess/deficiency of the inflowing exhaust gas with respect to the stoichiometric air-fuel ratio to calculate the estimated amount of change of the oxygen storage amount of the upstream side catalyst 20. Note that, the oxygen excess/deficiency of the inflowing exhaust gas with respect to the stoichiometric air-fuel ratio means the amount of oxygen becoming in excess or the amount of oxygen becoming deficient when trying to make the air-fuel ratio of the inflowing exhaust gas the stoichiometric air-fuel ratio. When the air-fuel ratio of the inflowing exhaust gas is leaner than the stoichiometric air-fuel ratio, the upstream side catalyst 20 stores oxygen, so the value of the oxygen excess/deficiency becomes positive. On the other hand, when the air-fuel ratio of the inflowing exhaust gas is richer than the stoichiometric air-fuel ratio, the upstream side catalyst 20 releases oxygen, so the value of the oxygen excess/deficiency becomes negative.

For this reason, when the air-fuel ratio of the inflowing exhaust gas is leaner than the stoichiometric air-fuel ratio, the air-fuel ratio control device calculates the estimated amount of change of the oxygen storage amount of the upstream side catalyst 20 as the cumulative value of the oxygen excess/deficiency of the inflowing exhaust gas with respect to the stoichiometric air-fuel ratio. Further, when the air-fuel ratio of the inflowing exhaust gas is richer than the stoichiometric air-fuel ratio, the air-fuel ratio control device calculates the estimated amount of change of the oxygen storage amount of the upstream side catalyst 20 as the absolute value of the cumulative value of the oxygen excess/deficiency of the inflowing exhaust gas with respect to the stoichiometric air-fuel ratio.

The oxygen excess/deficiency OED, for example, is calculated by the following formula (1) based on the output of the upstream side air-fuel ratio sensor 40 and the amount of fuel injection:

$$OED = 0.23 \times (AFup - 14.6) \times Qi \tag{1}$$

where, 0.23 is the concentration of oxygen in the air, 14.6 is the stoichiometric air-fuel ratio, Qi is the amount of fuel injection, and AFup is the output air-fuel ratio of the upstream side air-fuel ratio sensor 40.

Note that, the oxygen excess/deficiency OED may be calculated by the following formula (2) based on the output of the upstream side air-fuel ratio sensor 40 and the intake air amount:

$$OED = 0.23 \times (AFup - 14.6) \times Ga/AFup \tag{2}$$

where, 0.23 is the concentration of oxygen in the air, 14.6 is the stoichiometric air-fuel ratio, Ga is the intake air amount, and AFup is the output air-fuel ratio of the upstream side air-fuel ratio sensor 40. The intake air amount Ga is detected by the air flow meter 39.

Further, the oxygen excess/deficiency OED may be calculated based on the target air-fuel ratio of the inflowing exhaust gas without using the output of the upstream side air-fuel ratio sensor 40. In this case, in the above formulas (1) and (2), the value of the target air-fuel ratio is used instead of the output air-fuel ratio AFup of the upstream side air-fuel ratio sensor 40.

<Explanation of Air-Fuel Ratio Control Using Time Chart>

Figure 5:
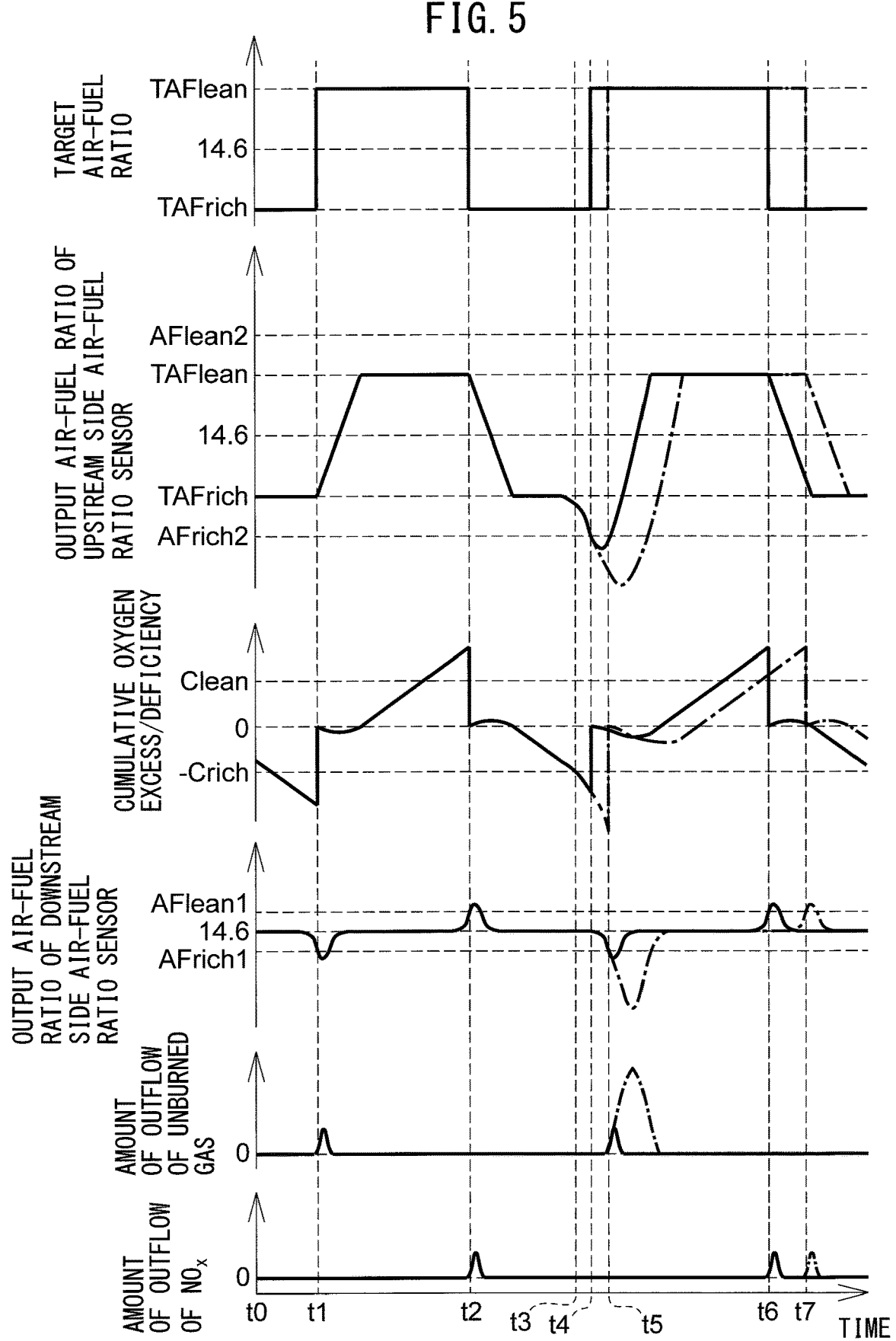
FIG. 5 is a time chart of a target air-fuel ratio of inflowing exhaust gas etc., when air-fuel ratio control in a first embodiment is performed.
Figure 6:
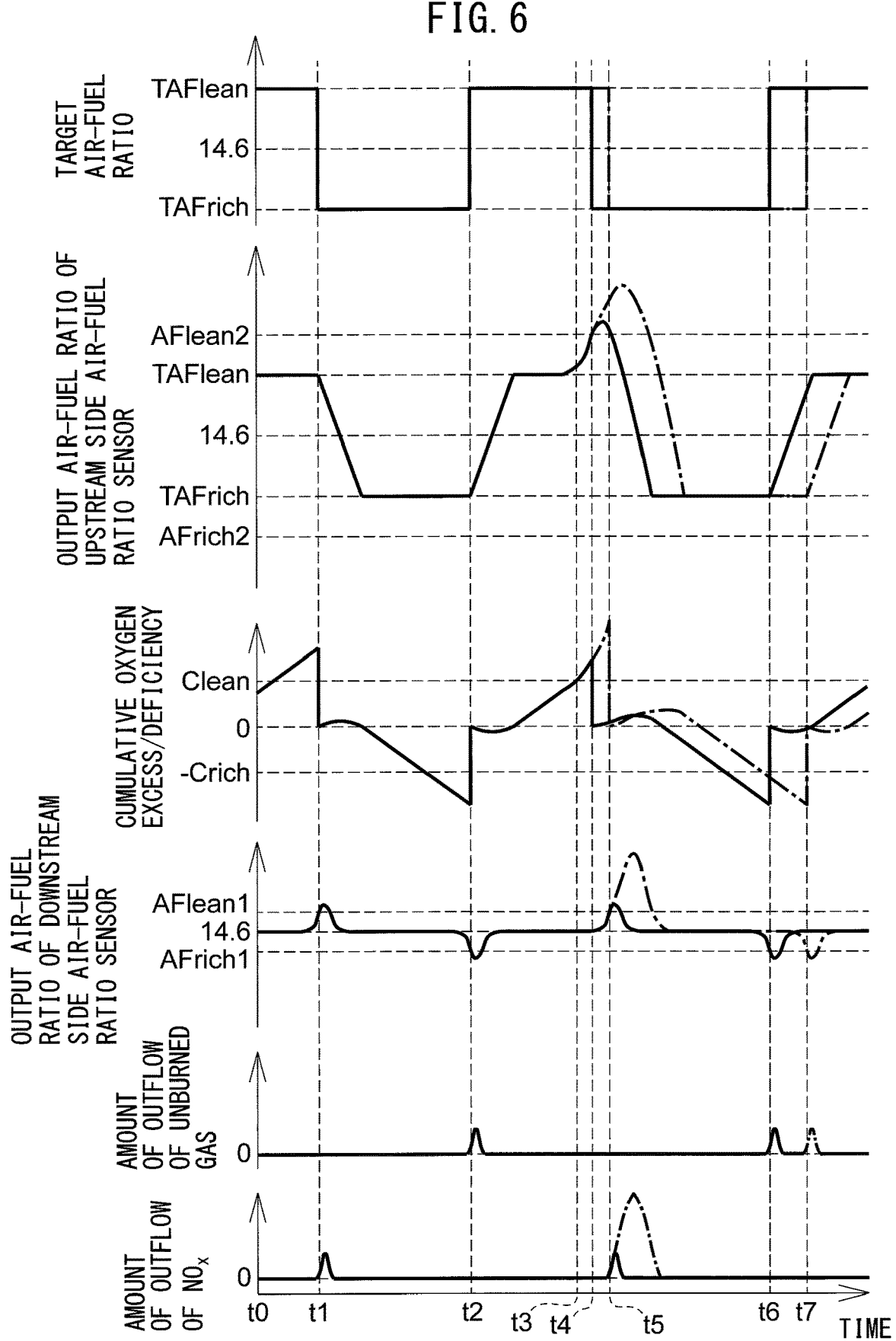
FIG. 6 is a time chart of a target air-fuel ratio of inflowing exhaust gas etc., when air-fuel ratio control in a first embodiment is performed.

Referring to FIG. 5 and FIG. 6, the air-fuel ratio control in the present embodiment will be specifically explained. First, referring to FIG. 5, the case of the air-fuel ratio of the inflowing exhaust gas deviating to the rich side from the target air-fuel ratio due to an external disturbance when the oxygen storage amount of the upstream side catalyst 20 is close to zero will be explained.

FIG. 5 is a time chart of the target air-fuel ratio of the inflowing exhaust gas, the output air-fuel ratio of the upstream side air-fuel ratio sensor 40, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of the unburned gas flowing out from the upstream side catalyst 20, and the amount of $NO_X$ flowing out from the upstream side catalyst 20, when air-fuel ratio control in the first embodiment is performed. The cumulative oxygen excess/deficiency is calculated by cumulatively adding the oxygen excess/deficiency calculated by the above formula (1) or (2). In FIG. 5, the solid line shows a time chart in the present embodiment, while the one-dot chain line shows a time chart in a comparative example of the present embodiment.

In the illustrated example, at the time t0, the target air-fuel ratio is set to the rich set air-fuel ratio TAFrich, and thus the air-fuel ratio of the inflowing exhaust gas is richer than the stoichiometric air-fuel ratio. For this reason, the upstream side catalyst 20 releases oxygen corresponding to the amount deficient for oxidizing the unburned gas. Note that, if no disturbance occurs in the air-fuel ratio, the output air-fuel ratio of the upstream side air-fuel ratio sensor 40 basically approximates the target air-fuel ratio.

At the time t0, the oxygen storage amount of the upstream side catalyst 20 is sufficient. The unburned gas and $NO_X$ in the exhaust gas flowing out from the upstream side catalyst 20 (below, referred to as the "outflowing exhaust gas") are removed by the upstream side catalyst 20. For this reason, the output air-fuel ratio of the downstream side air-fuel ratio sensor 41 substantially becomes the stoichiometric air-fuel ratio (in the present embodiment, 14.6).

After the time t0, when the oxygen storage amount of the upstream side catalyst 20 approaches zero, the output air-fuel ratio of the downstream side air-fuel ratio sensor 41 gradually falls and at the time t1 reaches the first rich judged air-fuel ratio AFrich1. At the time t1, it is considered that the oxygen storage amount of the upstream side catalyst 20 is substantially zero. After the time t1, a trace amount of unburned gas flows out from the upstream side catalyst 20.

To make the oxygen storage amount of the upstream side catalyst 20 increase, at the time t1, the target air-fuel ratio is switched from the rich set air-fuel ratio TAFrich to the lean set air-fuel ratio TAFlean. As a result, the output air-fuel ratio of the upstream side air-fuel ratio sensor 40 changes from the rich set air-fuel ratio TAFrich toward the lean set air-fuel ratio TAFlean. Further, at the time t1, the cumulative oxygen excess/deficiency is reset to zero.

After the time t1, along with the increase of the oxygen storage amount of the upstream side catalyst 20, the output air-fuel ratio of the downstream side air-fuel ratio sensor 41 converges to the stoichiometric air-fuel ratio. After that, when the oxygen storage amount of the upstream side catalyst 20 approaches the maximum oxygen storage amount, the output air-fuel ratio of the downstream side air-fuel ratio sensor 41 gradually rises and at the time t2 reaches the first lean judged air-fuel ratio AFlean1. At the time t2, it is considered that the oxygen storage amount of the upstream side catalyst 20 is substantially the maximum oxygen storage amount. After the time t2, a fine amount of $NO_X$ flows out from the upstream side catalyst 20.

To make the oxygen storage amount of the upstream side catalyst 20 decrease, at the time t2, the target air-fuel ratio is switched from the lean set air-fuel ratio TAFlean to the rich set air-fuel ratio TAFrich. As a result, the output air-fuel ratio of the upstream side air-fuel ratio sensor 40 changes from the lean set air-fuel ratio TAFlean toward the rich set air-fuel ratio TAFrich. Further, at the time t2, the cumulative oxygen excess/deficiency is reset to zero.

After the time t2, along with the decrease of the oxygen storage amount of the upstream side catalyst 20, the output air-fuel ratio of the downstream side air-fuel ratio sensor 41 converges to the stoichiometric air-fuel ratio. After that, at the time t3, the absolute value of the cumulative oxygen excess/deficiency reaches the rich side reference amount Crich. For this reason, at the time t3, the first condition is satisfied.

Further, as a result of the air-fuel ratio of the inflowing exhaust gas deviating to the rich side from the target air-fuel ratio (rich set air-fuel ratio TAFrich) due to the effect of an external disturbance, at the time t4, the output air-fuel ratio of the upstream side air-fuel ratio sensor 40 reaches the second rich judged air-fuel ratio AFrich2. For this reason, at the time t4, the second condition is satisfied. Further, at this time, the absolute value of the cumulative oxygen excess/deficiency becomes greater than the rich side reference amount Crich and the first condition remains being satisfied.

Therefore, at the time t4, the first condition and the second condition are satisfied and the target air-fuel ratio is switched from the rich set air-fuel ratio TAFrich to the lean set air-fuel ratio TAFlean. After that, at the time t5, the output air-fuel ratio of the downstream side air-fuel ratio sensor 41 reaches the first rich judged air-fuel ratio AFrich1.

On the other hand, in the comparative example shown by the one-dot chain line, when, at the time t5, the output air-fuel ratio of the downstream side air-fuel ratio sensor 41 reaches the first rich judged air-fuel ratio AFrich1, the target air-fuel ratio is switched from the rich set air-fuel ratio TAFrich to the lean set air-fuel ratio TAFlean. In this case, the time period during which inflowing exhaust gas with a large rich degree flows into the upstream side catalyst 20 becomes longer and a large amount of unburned gas flows out from the upstream side catalyst 20.

On the other hand, in the present embodiment, the target air-fuel ratio is switched when the first condition and the second condition are satisfied before the output air-fuel ratio of the downstream side air-fuel ratio sensor 41 reaches the first rich judged air-fuel ratio AFrich1, so the amount of unburned gas flowing out from the upstream side catalyst 20 is suppressed. Therefore, according to the air-fuel ratio control in the present embodiment, it is possible to keep the exhaust emission from deteriorating when making the oxygen storage amount of the upstream side catalyst 20 fluctuate. Note that, trace amounts of unburned gas and $NO_X$ flowing out from the upstream side catalyst 20 are removed by the downstream side catalyst 24.

After that, in the present embodiment, at the time t6, the output air-fuel ratio of the downstream side air-fuel ratio sensor 41 reaches the first lean judged air-fuel ratio AFlean1 and the target air-fuel ratio is switched from the lean set air-fuel ratio TAFlean to the rich set air-fuel ratio TAFrich. On the other hand, in the comparative example, at the time t7, the output air-fuel ratio of the downstream side air-fuel ratio sensor 41 reaches the first lean judged air-fuel ratio AFlean1 and the target air-fuel ratio is switched from the lean set air-fuel ratio TAFlean toward the rich set air-fuel ratio TAFrich.

Next, referring to FIG. 6, the case where the air-fuel ratio of the inflowing exhaust gas deviates to the lean side from the target air-fuel ratio due to an external disturbance when the oxygen storage amount of the upstream side catalyst 20 is close to the maximum oxygen storage amount will be explained.

FIG. 6 is a time chart of the target air-fuel ratio of the inflowing exhaust gas, the output air-fuel ratio of the upstream side air-fuel ratio sensor 40, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of unburned gas flowing out from the upstream side catalyst 20, and the amount of the $NO_X$ flowing out from the upstream side catalyst 20, when the air-fuel ratio control of the first embodiment is performed. In FIG. 6, the solid line shows a time chart of the present embodiment, while the one-dot chain line shows a time chart in a comparative example of the present embodiment.

In the illustrated example, at the time to, the target air-fuel ratio is set to the rich set air-fuel ratio TAFlean and the air-fuel ratio of the inflowing exhaust gas becomes leaner than the stoichiometric air-fuel ratio. At the time t0, the oxygen storage amount of the upstream side catalyst 20 is sufficiently smaller than the maximum oxygen storage amount and the unburned gas and $NO_X$ in the outflowing exhaust gas are removed by the upstream side catalyst 20. For this reason, the output air-fuel ratio of the downstream side air-fuel ratio sensor 41 becomes substantially the stoichiometric air-fuel ratio.

After the time t0, when the oxygen storage amount of the upstream side catalyst 20 approaches the maximum oxygen storage amount, the output air-fuel ratio of the downstream side air-fuel ratio sensor 41 gradually rises and at the time t1 reaches the first lean judged air-fuel ratio AFlean1. At the time t1, it is considered that the oxygen storage amount of the upstream side catalyst 20 is substantially the maximum oxygen storage amount. After the time t1, a trace amount of $NO_X$ flows out from the upstream side catalyst 20.

To make the oxygen storage amount of the upstream side catalyst 20 decrease, at the time t1, the target air-fuel ratio is switched from the lean set air-fuel ratio TAFlean to the rich set air-fuel ratio TAFrich. As a result, the output air-fuel ratio of the upstream side air-fuel ratio sensor 40 changes from the lean set air-fuel ratio TAFlean toward the rich set air-fuel ratio TAFrich. Further, at the time t1, the cumulative oxygen excess/deficiency is reset to zero.

After the time t1, along with the decrease of the oxygen storage amount of the upstream side catalyst 20, the output air-fuel ratio of the downstream side air-fuel ratio sensor 41 converges to the stoichiometric air-fuel ratio. After that, when the oxygen storage amount of the upstream side catalyst 20 approaches zero, the output air-fuel ratio of the downstream side air-fuel ratio sensor 41 gradually falls and at the time t2 reaches the first rich judged air-fuel ratio AFrich1. At the time t2, it is considered that the oxygen storage amount of the upstream side catalyst 20 is substantially zero. After the time t2, a trace amount of unburned gas flows out from the upstream side catalyst 20.

To make the oxygen storage amount of the upstream side catalyst 20 increase, at the time t2, the target air-fuel ratio is switched from the rich set air-fuel ratio TAFrich to the lean set air-fuel ratio TAFlean. As a result, the output air-fuel ratio of the upstream side air-fuel ratio sensor 40 changes from the rich set air-fuel ratio TAFrich toward the lean set air-fuel ratio TAFlean. Further, at the time t2, the cumulative oxygen excess/deficiency is reset to zero.

After the time t2, along with the increase of the oxygen storage amount of the upstream side catalyst 20, the output air-fuel ratio of the downstream side air-fuel ratio sensor 41 converges to the stoichiometric air-fuel ratio. After that, at the time t3, the cumulative oxygen excess/deficiency reaches the lean side reference amount Clean. For this reason, at the time t3, the third condition is satisfied.

Further, as a result of the air-fuel ratio of the inflowing exhaust gas deviating to the lean side from the target air-fuel ratio (lean set air-fuel ratio TAFlean) due to the effect of an external disturbance, at the time t4, the output air-fuel ratio of the upstream side air-fuel ratio sensor 40 reaches the second lean judged air-fuel ratio AFlean2. For this reason, at the time t4, the fourth condition is satisfied. Further, at this time, the cumulative oxygen excess/deficiency is greater than the lean side reference amount Clean and the third condition remains being satisfied.

Therefore, at the time t4, the third condition and the fourth condition are satisfied and the target air-fuel ratio is switched from the lean set air-fuel ratio TAFlean to the rich set air-fuel ratio TAFrich. After that, at the time t5, the output air-fuel ratio of the downstream side air-fuel ratio sensor 41 reaches the first lean judged air-fuel ratio AFlean1.

On the other hand, in the comparative example shown by the one-dot chain line, at the time t5, the target air-fuel ratio is switched from the lean set air-fuel ratio TAFlean to the rich set air-fuel ratio TAFrich when the output air-fuel ratio of the downstream side air-fuel ratio sensor 41 reaches the first lean judged air-fuel ratio AFlean1. In this case, the time period during which inflowing exhaust gas with a large lean degree flows into the upstream side catalyst 20 becomes longer and a large amount of $NO_X$ flows out from the upstream side catalyst 20.

On the other hand, in the present embodiment, the target air-fuel ratio is switched when the third condition and the fourth condition are satisfied before the output air-fuel ratio of the downstream side air-fuel ratio sensor 41 reaches the first lean judged air-fuel ratio AFlean1, so the amount of the $NO_X$ flowing out from the upstream side catalyst 20 is suppressed. Therefore, according to the air-fuel ratio control in the present embodiment, it is possible to keep the exhaust emission from deteriorating when making the oxygen storage amount of the upstream side catalyst 20 fluctuate. Note that, trace amounts of unburned gas and $NO_X$ flowing out from the upstream side catalyst 20 are removed at the downstream side catalyst 24.

After that, in the present embodiment, at the time t6, the output air-fuel ratio of the downstream side air-fuel ratio sensor 41 reaches the first rich judged air-fuel ratio AFrich1 and the target air-fuel ratio is switched from the rich set air-fuel ratio TAFrich to the lean set air-fuel ratio TAFlean. On the other hand, in the comparative example, at the time t7, the output air-fuel ratio of the downstream side air-fuel ratio sensor 41 reaches the first rich judged air-fuel ratio AFrich1 and the target air-fuel ratio is switched from the rich set air-fuel ratio TAFrich to the lean set air-fuel ratio TAFlean.

<Block Diagram of Control>

Figure 7:
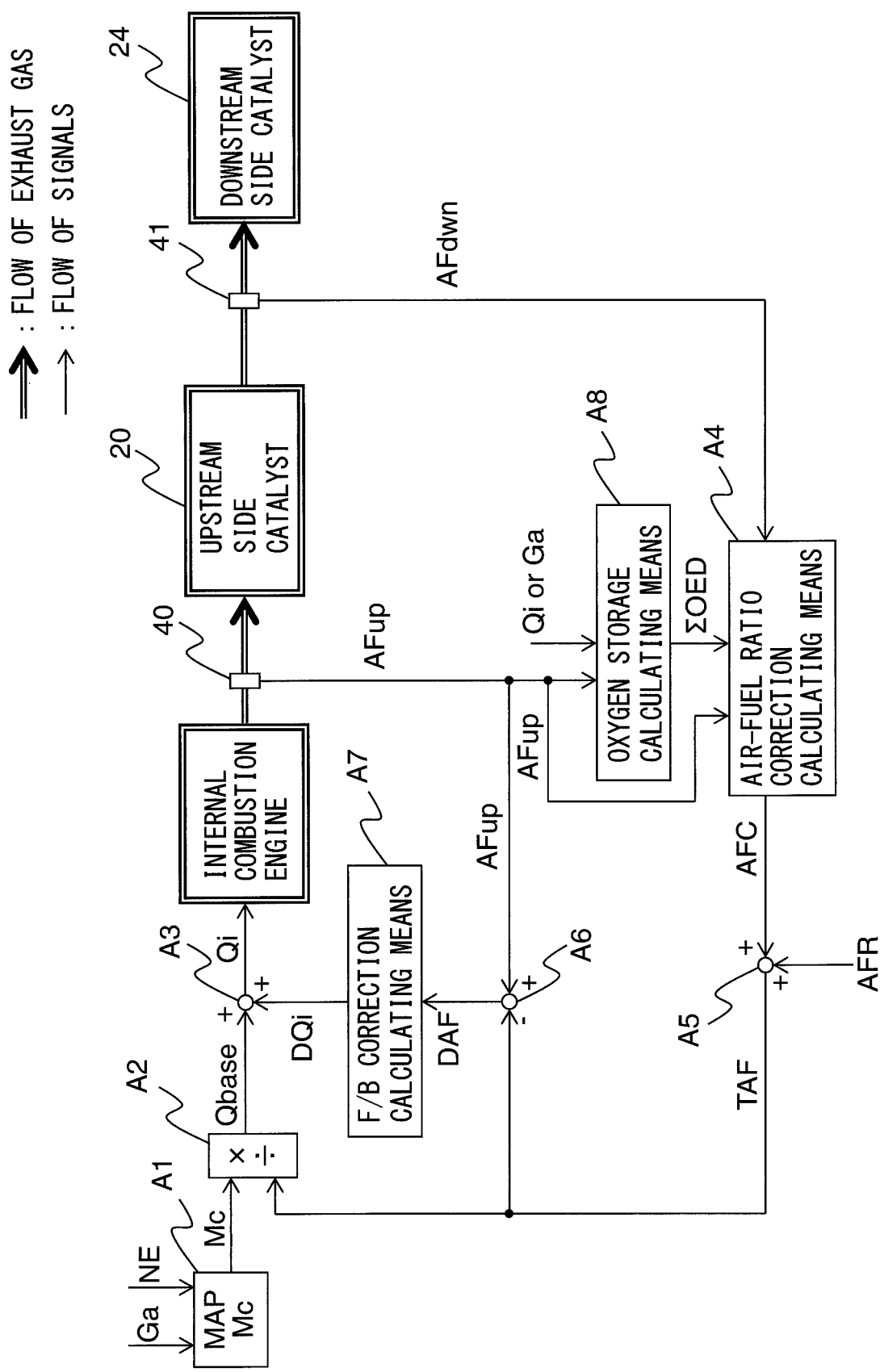
FIG. 7 is a block diagram of control of air-fuel ratio control.

Below, referring to FIG. 7 and FIG. 8, the air-fuel ratio control in the present embodiment will be explained in detail. FIG. 7 is a block diagram of control for air-fuel ratio control. The air-fuel ratio control device includes the functional blocks A1 to A8. Below, the functional blocks will be explained.

First, the calculation of the fuel injection amount will be explained. To calculate the fuel injection amount, the cylinder intake air calculating means A1, the basic fuel injection calculating means A2, and the fuel injection calculating means A3 are used.

The cylinder intake air calculating means A1 uses a map or calculation formula stored in the ROM 34 of the ECU 31 to calculate the intake air amount Mc to the cylinders based on the intake air amount Ga and the engine speed NE. The intake air amount Ga is detected by the air flow meter 39, while the engine speed NE is calculated based on the output of the crank angle sensor 44.

The basic fuel injection calculating means A2 divides the cylinder intake air amount Mc calculated by the cylinder intake air calculating means A1 by the target air-fuel ratio TAF to calculate the basic fuel injection amount Qbase (Qbase=Mc/TAF). The target air-fuel ratio TAF is calculated by the later explained target air-fuel ratio setting means A5.

The fuel injection calculating means A3 adds the basic fuel injection amount Qbase calculated by the basic fuel injection calculating means A2 and the later explained F/B correction amount DQi to calculate the fuel injection amount Qi (Qi=Qbase+DQi). An instruction for injection is given to the fuel injectors 11 so that fuel of the fuel injection amount Qi calculated in this way is injected from the fuel injectors 11.

Next, calculation of the target air-fuel ratio will be explained. For calculation of the target air-fuel ratio, the air-fuel ratio correction calculating means A4, target air-fuel ratio setting means A5 and oxygen storage calculating means A8 are used.

The oxygen storage amount calculating means A8 calculates the oxygen excess/deficiency by the above formula (1) or (2) based on the output air-fuel ratio AFup of the upstream side air-fuel ratio sensor 40 and the fuel injection amount Qi calculated by the fuel injection calculating means A3 or the intake air amount Ga. Further, the oxygen storage amount calculating means A8 cumulatively adds the oxygen excess/deficiency to calculate the cumulative oxygen excess/deficiency $\Sigma OED$.

In the air-fuel ratio correction calculating means A4, the air-fuel ratio correction amount AFC of the target air-fuel ratio is calculated based on the output air-fuel ratio AFdwn of the downstream side air-fuel ratio sensor 41, the cumulative oxygen excess/deficiency $\Sigma OED$ calculated by the oxygen storage calculating means A8, and the output air-fuel ratio AFup of the upstream side air-fuel ratio sensor 40. The target air-fuel ratio setting means A5 adds the air-fuel ratio correction amount AFC calculated by the air-fuel ratio correction calculating means A4 to the control center air-fuel ratio AFR (in the present embodiment, the stoichiometric air-fuel ratio) to calculate the target air-fuel ratio TAF. The thus calculated target air-fuel ratio TAF is input to the basic fuel injection calculating means A2 and later explained air-fuel ratio deviation calculating means A6.

Next, the calculation of the F/B correction amount based on the output air-fuel ratio AFup of the upstream side air-fuel ratio sensor 40 will be explained. To calculate the F/B correction amount, the air-fuel ratio deviation calculating means A6 and F/B correction calculating means A7 are used.

The air-fuel ratio deviation calculating means A6 subtracts the target air-fuel ratio TAF calculated by the target air-fuel ratio setting means A5 from the output air-fuel ratio AFup of the upstream side air-fuel ratio sensor 40 to calculate the deviation of air-fuel ratio DAF (DAF=AFup−TAF). This deviation of air-fuel ratio DAF is a value indicating the excess/deficiency of the amount of supply of fuel with respect to the target air-fuel ratio TAF.

The F/B correction calculating means A7 processes the deviation of air-fuel ratio DAF calculated by the air-fuel ratio deviation calculating means A6 by proportional integral differential processing (PID processing) to calculate the F/B correction amount DQi for compensating for the excess or deficiency of the amount of supply of fuel based on the following formula (3). The thus calculated F/B correction amount DQi is input to the fuel injection calculating means A3.

$$DQi = Kp \cdot DAF + Ki \cdot SDAF + Kd \cdot DDAF \quad (3)$$

In the above formula (3), Kp is a preset proportional gain (proportional constant), Ki is the preset integral gain (integral constant), and Kd is the preset differential gain (differential constant). Further, DDAF is the time differential of the deviation of air-fuel ratio DAF and is calculated by dividing the deviation between the currently updated deviation of air-fuel ratio DAF and the previous deviation of air-fuel ratio DAF by the time corresponding to the updating interval. Further, SDAF is the time integral of the deviation of air-fuel ratio DAF and is calculated by adding the currently updated deviation of air-fuel ratio DAF to the previous time integral SDAF.

Note that, if feedback control based on the output of the upstream side air-fuel ratio sensor 40 is not performed, the air-fuel ratio deviation calculating means A6 and F/B correction calculating means A7 are not used for the air-fuel ratio control. In this case, the air-fuel ratio deviation calculating means A6 and F/B correction calculating means A7 are deleted from the block diagram of control shown in FIG. 7. Further, if the oxygen excess/deficiency is calculated based on the target air-fuel ratio of the inflowing exhaust gas instead of the output of the upstream side air-fuel ratio sensor 40, the target air-fuel ratio TAF is input to the oxygen storage calculating means A8 instead of the output air-fuel ratio AFup of the upstream side air-fuel ratio sensor 40.

<Processing for Setting Target Air-Fuel Ratio>

Figure 8:
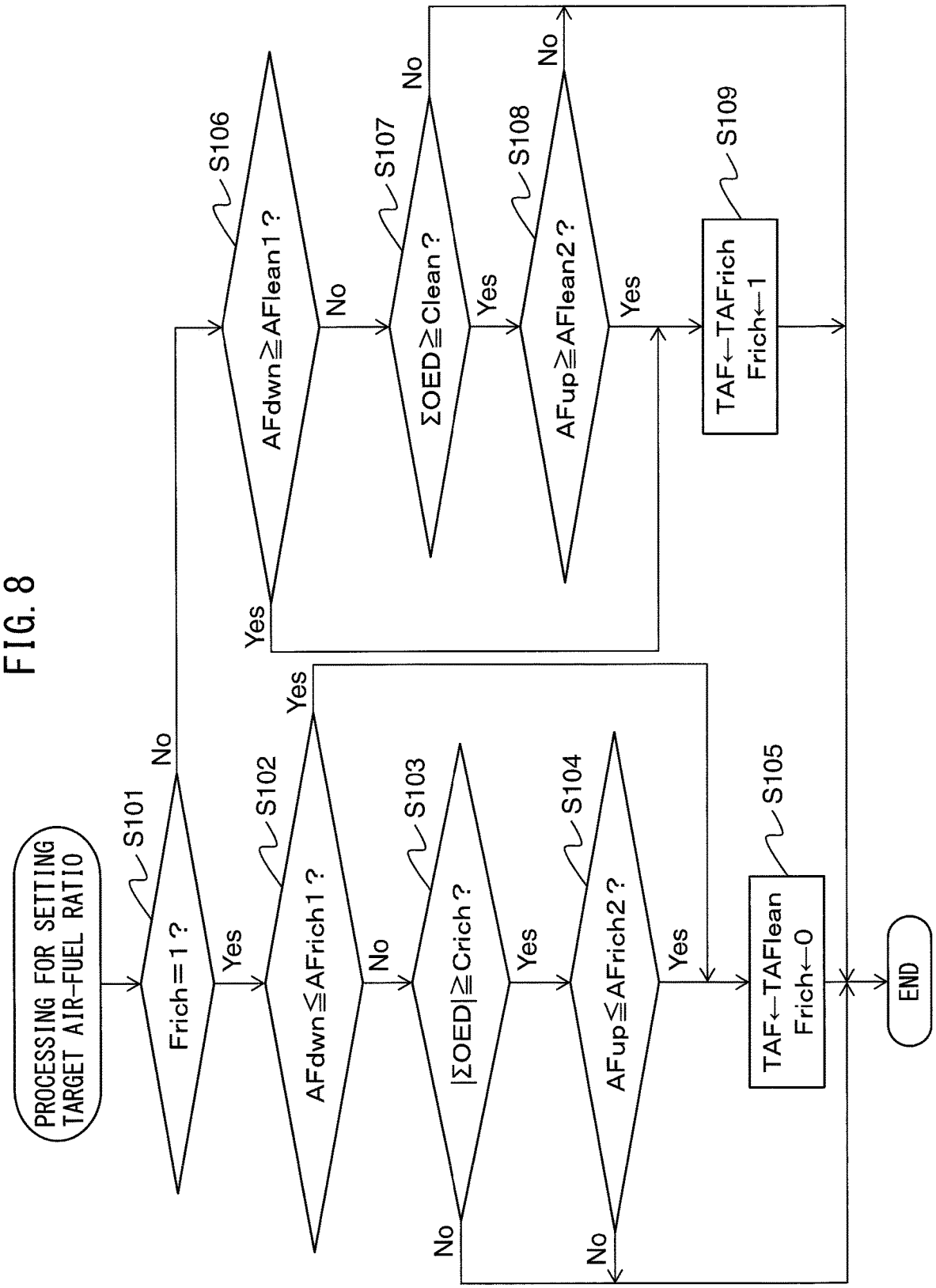
FIG. 8 is a flow chart showing a control routine of processing for setting a target air-fuel ratio in the first embodiment.

FIG. 8 is a flow chart showing a control routine of processing for setting a target air-fuel ratio in the first embodiment. The present control routine is repeatedly performed by the ECU 31 at predetermined time intervals after startup of the internal combustion engine.

First, at step S101, it is judged whether the rich flag Frich is "1". The rich flag Frich is set to "1" when the target air-fuel ratio TAF is set to the rich set air-fuel ratio TAFrich, while is set to "0" when the target air-fuel ratio TAF is set to the lean set air-fuel ratio TAFlean. Note that, the initial value of the rich flag Frich is set to "0" or "1".

If at step S101 it is judged that the rich flag Frich is "1", the present control routine proceeds to step S102. In this case, the target air-fuel ratio TAF is set to the rich set air-fuel ratio TAFrich. At step S102, it is judged whether the output air-fuel ratio AFdwn of the downstream side air-fuel ratio sensor 41 is equal to or less than the first rich judged air-fuel ratio AFrich1.

If at step S102 it is judged that the output air-fuel ratio AFdwn of the downstream side air-fuel ratio sensor 41 is equal to or less than the first rich judged air-fuel ratio AFrich1, the present control routine proceeds to step S105. At step S105, the target air-fuel ratio TAF is set to the lean set air-fuel ratio TAFlean while the rich flag Frich is set to zero. After step S105, the present control routine ends.

On the other hand, if at step S102 it is judged that the output air-fuel ratio AFdwn of the downstream side air-fuel ratio sensor 41 is higher than the first rich judged air-fuel ratio AFrich1, the present control routine proceeds to step S103. At step S103, it is judged whether the absolute value of the cumulative oxygen excess/deficiency $\Sigma OED$ is equal to or larger than the rich side reference amount Crich. That is, it is judged whether the first condition is satisfied.

The cumulative oxygen excess/deficiency $\Sigma OED$ is calculated by cumulatively adding the oxygen excess/deficiency OED calculated by the above formula (1) or (2).

Further, the cumulative oxygen excess/deficiency ΣOED is reset to zero when the target air-fuel ratio TAF is switched from the rich set air-fuel ratio TAFrich to the lean set air-fuel ratio TAFlean and when the target air-fuel ratio TAF is switched from the lean set air-fuel ratio TAFlean to the rich set air-fuel ratio TAFrich.

Further, the rich side reference amount Crich is, for example, set to a value smaller than the maximum oxygen storage amount of the upstream side catalyst 20 in the unused state (for example, a value of 0.5 to 0.8 time the maximum oxygen storage amount). Note that, the rich side reference amount Crich may be set to a value smaller than the maximum oxygen storage amount of the upstream side catalyst 20 calculated by a known method (for example, a value of 0.5 to 0.8 time the maximum oxygen storage amount).

If at step S103 it is judged that the absolute value of the cumulative oxygen excess/deficiency ΣOED is equal to or larger than the rich side reference amount Crich, the present control routine proceeds to step S104. At step S104, it is judged whether the output air-fuel ratio AFup of the upstream side air-fuel ratio sensor 40 is equal to or less than the second rich judged air-fuel ratio AFrich2. That is, it is judged whether the second condition is satisfied.

If at step S104 it is judged that the output air-fuel ratio AFup of the upstream side air-fuel ratio sensor 40 is equal to or less than the second rich judged air-fuel ratio AFrich2, the present control routine proceeds to step S105. At step S105, the target air-fuel ratio TAF is set to the lean set air-fuel ratio TAFlean and the rich flag Frich is set to "0". After step S105, the present control routine ends.

On the other hand, if at step S103 it is judged that the absolute value of the cumulative oxygen excess/deficiency ΣOED is less than the rich side reference amount Crich or if at step S104 it is judged that the output air-fuel ratio AFup of the upstream side air-fuel ratio sensor 40 is higher than the second rich judged air-fuel ratio AFrich2, the present control routine ends. In this case, the target air-fuel ratio TAF is maintained at the current value.

Further, if at step S101 it is judged that the rich flag Frich is zero, the present control routine proceeds to step S106. In this case, the target air-fuel ratio TAF is set to the lean set air-fuel ratio TAFlean. At step S106, it is judged whether the output air-fuel ratio AFdwn of the downstream side air-fuel ratio sensor 41 is equal to or larger than the first lean judged air-fuel ratio AFlean1.

If at step S106 it is judged that the output air-fuel ratio AFdwn of the downstream side air-fuel ratio sensor 41 is equal to or larger than the first lean judged air-fuel ratio AFlean1, the present control routine proceeds to step S109. At step S109, the target air-fuel ratio TAF is set to the rich set air-fuel ratio TAFrich and the rich flag Frich is set to "1". After step S109, the present control routine ends.

On the other hand, if at step S106 it is judged that the output air-fuel ratio AFdwn of the downstream side air-fuel ratio sensor 41 is lower than the first lean judged air-fuel ratio AFlean1, the present control routine proceeds to step S107. At step S107, it is judged whether the cumulative oxygen excess/deficiency ΣOED is equal to or larger than the lean side reference amount Clean. That is, it is judged whether the third condition is satisfied.

The lean side reference amount Clean is, for example, set to a value smaller than the maximum oxygen storage amount of the upstream side catalyst 20 in the unused state (for example, a value of 0.5 to 0.8 time the maximum oxygen storage amount). Note that, the lean side reference amount Clean may be set to a value smaller than the maximum oxygen storage amount of the upstream side catalyst 20 calculated by a known method (for example, a value of 0.5 to 0.8 time the maximum oxygen storage amount).

If at step S107 it is judged that the cumulative oxygen excess/deficiency ΣOED is equal to or larger than the lean side reference amount Clean, the present control routine proceeds to step S108. At step S108, it is judged whether the output air-fuel ratio AFup of the upstream side air-fuel ratio sensor 40 is equal to or larger than the second lean judged air-fuel ratio AFlean2. That is, it is judged whether the fourth condition is satisfied.

If at step S108 it is judged that the output air-fuel ratio AFup of the upstream side air-fuel ratio sensor 40 is equal to or larger than the second lean judged air-fuel ratio AFlean2, the present control routine proceeds to step S109. At step S109, the target air-fuel ratio TAF is set to the rich set air-fuel ratio TAFrich and the rich flag Frich is set to "1". After step S109, the present control routine ends.

On the other hand, if at step S107 it is judged that the cumulative oxygen excess/deficiency ΣOED is less than the lean side reference amount Clean or if at step S108 it is judged that the output air-fuel ratio AFup of the upstream side air-fuel ratio sensor 40 is lower than the second lean judged air-fuel ratio AFlean2, the present control routine ends. In this case, the target air-fuel ratio TAF is maintained at the current value.

Second Embodiment

The configuration and control of the exhaust purification system of the internal combustion engine in a second embodiment are basically similar to the exhaust purification system of the internal combustion engine in the first embodiment except for the points explained below. For this reason, below, the second embodiment of the present invention will be explained focusing on the parts different from the first embodiment.

In the second embodiment, the air-fuel ratio control device switches the target air-fuel ratio from the rich set air-fuel ratio to the lean set air-fuel ratio when the output air-fuel ratio of the downstream side air-fuel ratio sensor 41 reaches the first rich judged air-fuel ratio. Further, the air-fuel ratio control device switches the target air-fuel ratio from the lean set air-fuel ratio to the rich set air-fuel ratio when it is judged that the estimated amount of change of the oxygen storage amount of the upstream side catalyst 20 when the target air-fuel ratio is maintained at the lean set air-fuel ratio has reached the switching storage amount. Due to this, in the present embodiment, it is possible to make the oxygen storage amount of the upstream side catalyst 20 fluctuate between zero and the switching storage amount.

The rich set air-fuel ratio and the first rich judged air-fuel ratio are preset and are air-fuel ratios richer than the stoichiometric air-fuel ratio. Further, the rich set air-fuel ratio is richer than the first rich judged air-fuel ratio. That is, the rich degree of the rich set air-fuel ratio is larger than the rich degree of the first rich judged air-fuel ratio. Further, the first rich judged air-fuel ratio is set to an air-fuel ratio corresponding to the output of the downstream side air-fuel ratio sensor 41 when the oxygen storage amount of the upstream side catalyst 20 decreases and the atmosphere of upstream side catalyst 20 changes from the stoichiometric air-fuel ratio to rich.

The lean set air-fuel ratio is preset and is an air-fuel ratio leaner than the stoichiometric air-fuel ratio. Further, the switching storage amount is preset and is set to a value smaller than the maximum oxygen storage amount of the upstream side catalyst 20. Note that, the air-fuel ratio control device uses a method similar to the first embodiment to calculate the estimated amount of change of the oxygen storage amount of the upstream side catalyst 20.

As explained above, at the time of acceleration or deceleration etc., of the vehicle mounting the internal combustion engine, sometimes the air-fuel ratio of the inflowing exhaust gas will temporarily deviate from the target air-fuel ratio due to an external disturbance. If the air-fuel ratio of the inflowing exhaust gas deviates to the rich side from the target air-fuel ratio, the unburned gas flowing into the upstream side catalyst 20 becomes greater. For this reason, when the oxygen storage amount of the upstream side catalyst 20 is close to zero, a large amount of unburned gas is liable to flow out from the upstream side catalyst 20 if the air-fuel ratio of the inflowing exhaust gas deviates to the rich side from the target air-fuel ratio.

On the other hand, when the oxygen storage amount of the upstream side catalyst 20 is sufficiently larger than zero, even if the air-fuel ratio of the inflowing exhaust gas deviates to the rich side from the target air-fuel ratio, there is little possibility of the oxygen storage amount of the upstream side catalyst 20 reaching zero. Further, if the air-fuel ratio of the inflowing exhaust gas deviates to the rich side from the target air-fuel ratio due to an external disturbance, the output air-fuel ratio of the upstream side air-fuel ratio sensor 40 will also deviate to the rich side from the target air-fuel ratio.

For this reason, in the second embodiment, if a fifth condition wherein an estimated amount of change of the oxygen storage amount of the upstream side catalyst 20 when the target air-fuel ratio is maintained at the rich set air-fuel ratio is equal to or larger than a first reference amount, and a sixth condition wherein a difference of the output air-fuel ratio of the upstream side air-fuel ratio sensor 40 and a stoichiometric air-fuel ratio is equal to or larger than a difference of a second rich judged air-fuel ratio and a stoichiometric air-fuel ratio are satisfied, the air-fuel ratio control device switches the target air-fuel ratio from the rich set air-fuel ratio to the lean set air-fuel ratio when the fifth condition and the sixth condition are satisfied. Note that, the sixth condition is satisfied when the output air-fuel ratio of the upstream side air-fuel ratio sensor 40 is equal to or less than the second rich judged air-fuel ratio.

The second rich judged air-fuel ratio is preset and is an air-fuel ratio richer than the stoichiometric air-fuel ratio. Further, the second rich judged air-fuel ratio is richer than the rich set air-fuel ratio. That is, the rich degree of the second rich judged air-fuel ratio is larger than the rich degree of the rich set air-fuel ratio. The first reference amount is preset and is set to a value smaller than the switching storage amount. In other words, the switching storage amount is set to a value larger than the first reference amount.

<Explanation of Air-Fuel Ratio Control Using Time Chart>

Figure 9:
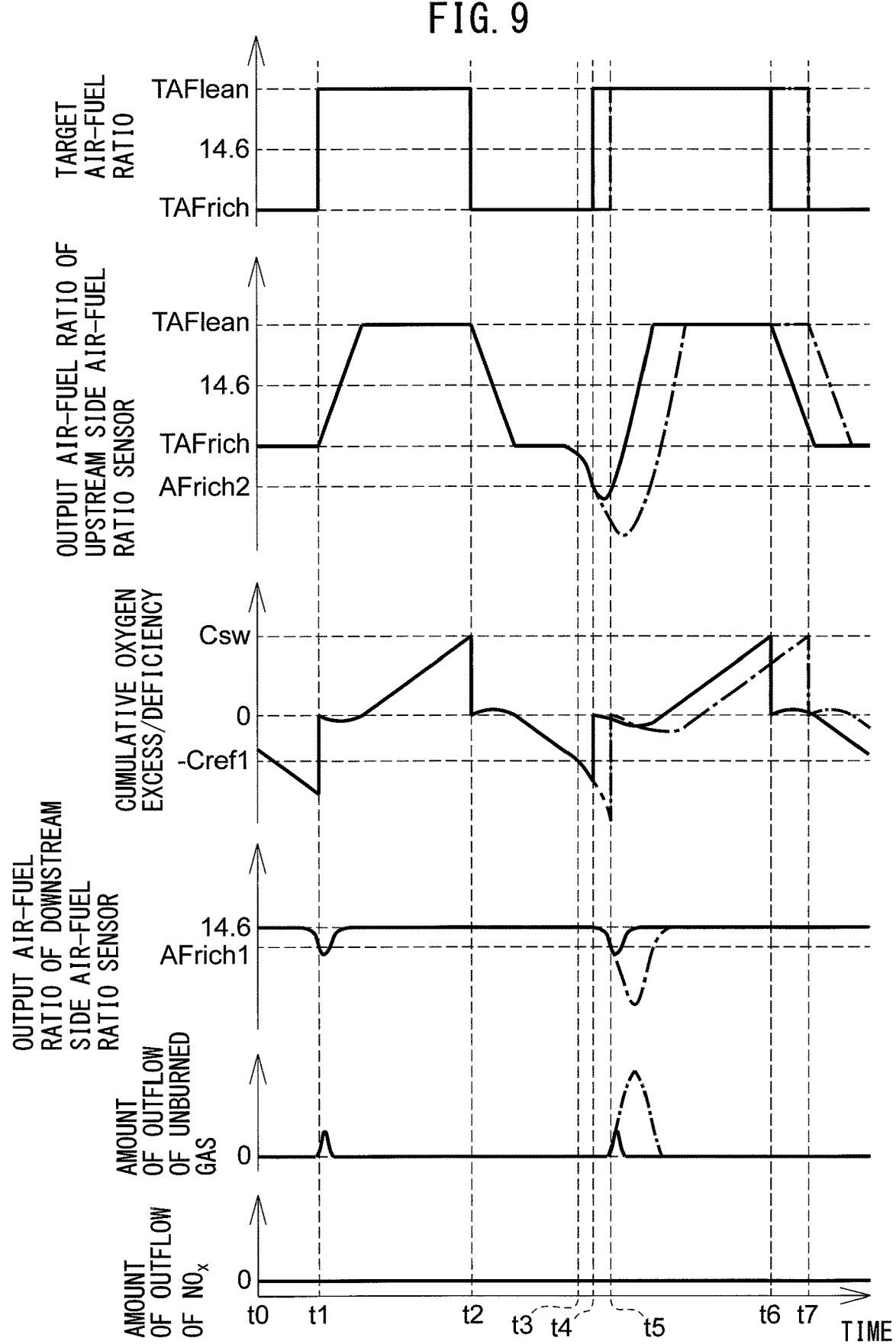
FIG. 9 is a time chart of a target air-fuel ratio of inflowing exhaust gas etc., when air-fuel ratio control in a second embodiment is performed.

Referring to FIG. 9, the air-fuel ratio control in the second embodiment will be specifically explained. FIG. 9 is a time chart of the target air-fuel ratio of the inflowing exhaust gas, the output air-fuel ratio of the upstream side air-fuel ratio sensor 40, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of unburned gas flowing out from the upstream side catalyst 20, and the amount of the $NO_X$ flowing out from the upstream side catalyst 20 when air-fuel ratio control in the second embodiment is performed. The cumulative oxygen excess/deficiency is calculated by cumulatively adding the oxygen excess/deficiency calculated by the above formula (1) or (2). In FIG. 9, the solid line shows a time chart in the second embodiment, while the one-dot chain line shows a time chart in a comparative example of the second embodiment.

In the illustrated example, at the time t0, the target air-fuel ratio is set to the rich set air-fuel ratio TAFrich, and thus the air-fuel ratio of the inflowing exhaust gas is richer than the stoichiometric air-fuel ratio. For this reason, the upstream side catalyst 20 releases oxygen corresponding to the amount deficient for oxidizing the unburned gas. Note that, if no disturbance occurs in the air-fuel ratio, the output air-fuel ratio of the upstream side air-fuel ratio sensor 40 basically approximates the target air-fuel ratio.

At the time t0, the oxygen storage amount of the upstream side catalyst 20 is sufficient. The unburned gas and $NO_X$ in the outflowing exhaust gas are removed by the upstream side catalyst 20. For this reason, the output air-fuel ratio of the downstream side air-fuel ratio sensor 41 substantially becomes the stoichiometric air-fuel ratio.

After the time t0, when the oxygen storage amount of the upstream side catalyst 20 approaches zero, the output air-fuel ratio of the downstream side air-fuel ratio sensor 41 gradually falls and at the time t1 reaches the first rich judged air-fuel ratio AFrich1. At the time t1, it is considered that the oxygen storage amount of the upstream side catalyst 20 is substantially zero. After the time t1, a trace amount of unburned gas flows out from the upstream side catalyst 20.

To make the oxygen storage amount of the upstream side catalyst 20 increase, at the time t1, the target air-fuel ratio is switched from the rich set air-fuel ratio TAFrich to the lean set air-fuel ratio TAFlean. As a result, the output air-fuel ratio of the upstream side air-fuel ratio sensor 40 changes from the rich set air-fuel ratio TAFrich toward the lean set air-fuel ratio TAFlean. Further, at the time t1, the cumulative oxygen excess/deficiency is reset to zero.

After the time t1, the cumulative oxygen excess/deficiency gradually increases and, at the time t2, reaches the switching storage amount Csw. For this reason, to make the oxygen storage amount of the upstream side catalyst 20 decrease, at the time t2, the target air-fuel ratio is switched from the lean set air-fuel ratio TAFlean to the rich set air-fuel ratio TAFrich. Further, at the time t2, the cumulative oxygen excess/deficiency is reset to zero. Note that, at the time t2, the oxygen storage amount of the upstream side catalyst 20 does not reach the maximum oxygen storage amount, so almost no $NO_X$ flows out from the upstream side catalyst 20.

After the time t2, at the time t3, the absolute value of the cumulative oxygen excess/deficiency reaches the first reference amount Crefl. For this reason, at the time t3, the fifth condition is satisfied.

Further, as a result of the air-fuel ratio of the inflowing exhaust gas deviating to the rich side from the target air-fuel ratio (rich set air-fuel ratio TAFrich) due to the effect of an external disturbance, at the time t4, the output air-fuel ratio of the upstream side air-fuel ratio sensor 40 reaches the second rich judged air-fuel ratio AFrich2. For this reason, at the time t4, the sixth condition is satisfied. Further, at this time, the absolute value of the cumulative oxygen excess/deficiency becomes greater than the first reference amount Crefl and the fifth condition remains being satisfied.

Therefore, at the time t4, the fifth condition and the sixth condition are satisfied and the target air-fuel ratio is switched from the rich set air-fuel ratio TAFrich to the lean set air-fuel ratio TAFlean. After that, at the time t5, the output air-fuel ratio of the downstream side air-fuel ratio sensor 41 reaches the first rich judged air-fuel ratio AFrich1.

On the other hand, in the comparative example shown by the one-dot chain line, when, at the time t5, the output air-fuel ratio of the downstream side air-fuel ratio sensor 41 reaches the first rich judged air-fuel ratio AFrich1, the target air-fuel ratio is switched from the rich set air-fuel ratio TAFrich to the lean set air-fuel ratio TAFlean. In this case, the time period during which the inflowing exhaust gas with a large rich degree flows into the upstream side catalyst 20 becomes longer and a large amount of unburned gas flows out from the upstream side catalyst 20.

On the other hand, in the present embodiment, the target air-fuel ratio is switched when the fifth condition and the sixth condition are satisfied before the output air-fuel ratio of the downstream side air-fuel ratio sensor 41 reaches the first rich judged air-fuel ratio AFrich1, so the amount of unburned gas flowing out from the upstream side catalyst 20 is suppressed. Therefore, according to the air-fuel ratio control in the present embodiment, it is possible to keep the exhaust emission from deteriorating when making the oxygen storage amount of the upstream side catalyst 20 fluctuate. Note that, the trace amount of unburned gas flowing out from the upstream side catalyst 20 is removed by the downstream side catalyst 24.

After that, in the present embodiment, at the time t6, the cumulative oxygen excess/deficiency reaches the switching storage amount Csw and the target air-fuel ratio is switched from the lean set air-fuel ratio TAFlean to the rich set air-fuel ratio TAFrich. On the other hand, in the comparative example, at the time t7, the cumulative oxygen excess/deficiency reaches the switching storage amount Csw and the target air-fuel ratio is switched from the lean set air-fuel ratio TAFlean to the rich set air-fuel ratio TAFrich.

<Processing for Setting Target Air-Fuel Ratio>

Below, the air-fuel ratio control in the second embodiment will be explained in detail. Note that, in the second embodiment, in the same way as the first embodiment, the block diagram of control of the air-fuel ratio control shown in FIG. 7 is used.

Figure 10:
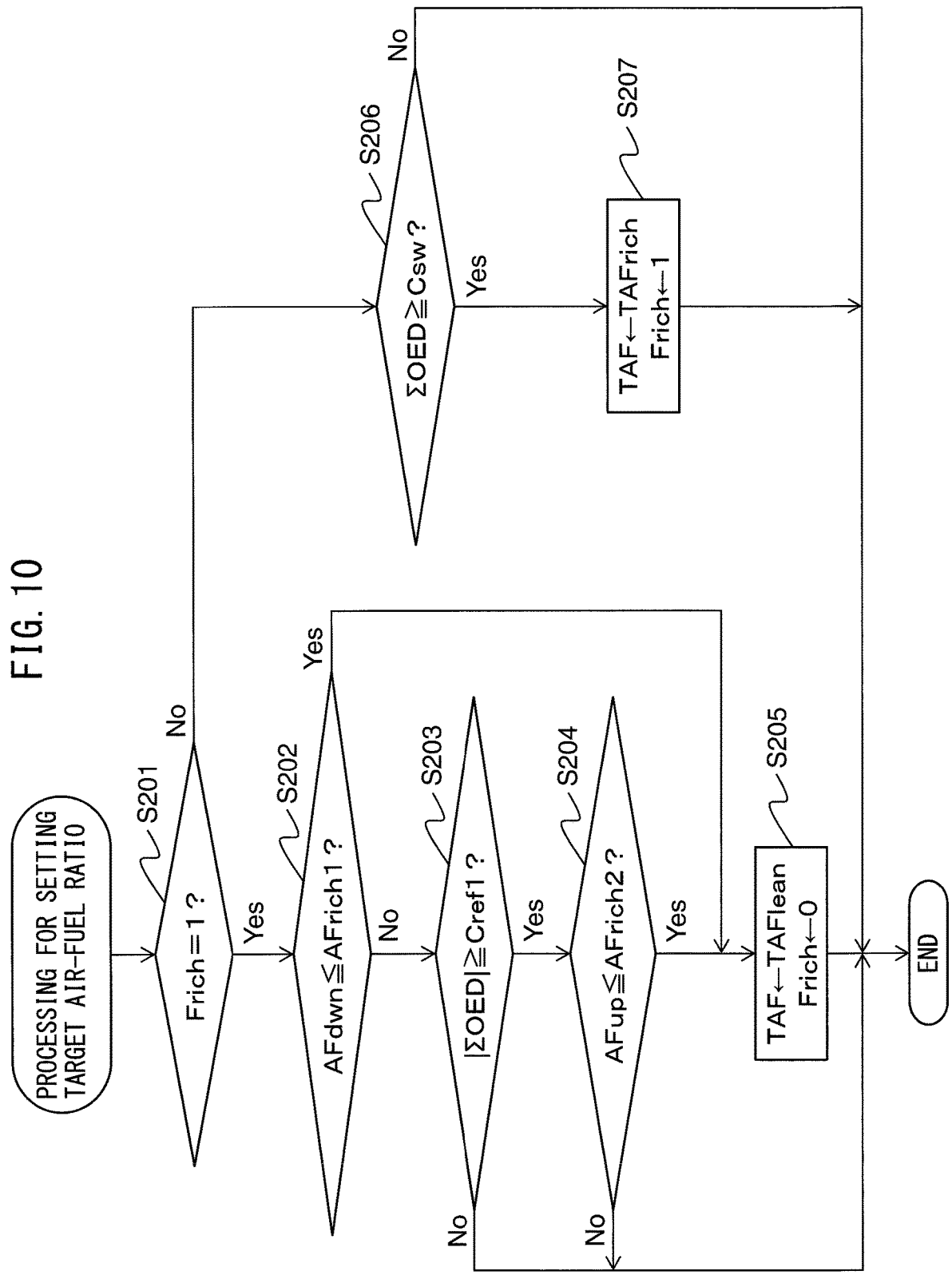
FIG. 10 is a flow chart showing a control routine of processing for setting a target air-fuel ratio in the second embodiment.

FIG. 10 is a flow chart showing a control routine of processing for setting the target air-fuel ratio in the second embodiment. The present control routine is repeatedly performed by the ECU 31 at predetermined time intervals after startup of the internal combustion engine.

First, at step S201, it is judged whether the rich flag Frich is "1". The rich flag Frich is set to "1" when the target air-fuel ratio TAF is set to the rich set air-fuel ratio TAFrich, while is set to "0" when the target air-fuel ratio TAF is set to the lean set air-fuel ratio TAFlean. Note that, the initial value of the rich flag Frich is set to "0" or "1".

If at step S201 it is judged that the rich flag Frich is "1", the present control routine proceeds to step S202. In this case, the target air-fuel ratio TAF is set to the rich set air-fuel ratio TAFrich. At step S202, it is judged whether the output air-fuel ratio AFdwn of the downstream side air-fuel ratio sensor 41 is equal to or less than the first rich judged air-fuel ratio AFrich1.

If at step S202 it is judged that the output air-fuel ratio AFdwn of the downstream side air-fuel ratio sensor 41 is equal to or less than the first rich judged air-fuel ratio AFrich1, the present control routine proceeds to step S205. At step S205, the target air-fuel ratio TAF is set to the lean set air-fuel ratio TAFlean and the rich flag Frich is set to "0". After step S205, the present control routine ends.

On the other hand, if at step S202 it is judged that the output air-fuel ratio AFdwn of the downstream side air-fuel ratio sensor 41 is higher than the first rich judged air-fuel ratio AFrich1, the present control routine proceeds to step S203. At step S203, it is judged whether the absolute value of the cumulative oxygen excess/deficiency ΣOED is equal to or larger than the first reference amount Crefl. That is, it is judged whether the fifth condition is satisfied.

The cumulative oxygen excess/deficiency ΣOED is calculated by cumulatively adding the oxygen excess/deficiency OED calculated by the above formula (1) or (2). Further, the cumulative oxygen excess/deficiency ΣOED is reset to zero when the target air-fuel ratio TAF is switched from the rich set air-fuel ratio TAFrich to the lean set air-fuel ratio TAFlean and when the target air-fuel ratio TAF is switched from the lean set air-fuel ratio TAFlean to the rich set air-fuel ratio TAFrich. Further, the first reference amount Crefl is, for example, set to a value of 0.5 to 0.8 time the switching storage amount Csw.

If at step S203 it is judged that the absolute value of the cumulative oxygen excess/deficiency ΣOED is equal to or larger than the first reference amount Crefl, the present control routine proceeds to step S204. At step S204, it is judged whether the output air-fuel ratio AFup of the upstream side air-fuel ratio sensor 40 is equal to or less than the second rich judged air-fuel ratio AFrich2. That is, it is judged whether the sixth condition is satisfied.

If at step S204 it is judged that the output air-fuel ratio AFup of the upstream side air-fuel ratio sensor 40 is equal to or less than the second rich judged air-fuel ratio AFrich2, the present control routine proceeds to step S205. At step S205, the target air-fuel ratio TAF is set to the lean set air-fuel ratio TAFlean and the rich flag Frich is set to "0". After step S205, the present control routine ends.

On the other hand, if at step S203 it is judged that the absolute value of the cumulative oxygen excess/deficiency ΣOED is less than the first reference amount Crefl or if at step S204 it is judged that the output air-fuel ratio AFup of the upstream side air-fuel ratio sensor 40 is higher than the second rich judged air-fuel ratio AFrich2, the present control routine ends. In this case, the target air-fuel ratio TAF is maintained at the current value.

Further, if at step S201 it is judged that the rich flag Frich is "0", the present control routine proceeds to step S206. In this case, the target air-fuel ratio TAF is set to the lean set air-fuel ratio TAFlean. At step S206, it is judged whether the cumulative oxygen excess/deficiency ΣOED is equal to or larger than the switching storage amount Csw.

The switching storage amount Csw is, for example, set to a value smaller than the maximum oxygen storage amount of the upstream side catalyst 20 in the unused state (for example, a value of 0.2 to 0.8 time the maximum oxygen storage amount). Note that, the switching storage amount Csw may be set to a value smaller than the maximum oxygen storage amount of the upstream side catalyst 20 calculated by a known method (for example, a value of 0.2 to 0.8 time the maximum oxygen storage amount).

If at step S206 it is judged that the cumulative oxygen excess/deficiency ΣOED is equal to or larger than the switching storage amount Csw, the present control routine proceeds to step S207. At step S207, the target air-fuel ratio TAF is set to the rich set air-fuel ratio TAFrich and the rich flag Frich is set to "1". After step S207, the present control routine ends.

On the other hand, if at step S206 it is judged that the cumulative oxygen excess/deficiency ΣOED is less than the switching storage amount Csw, the present control routine ends. In this case, the target air-fuel ratio TAF is maintained at the current value.

Third Embodiment

The configuration and control of the exhaust purification system of the internal combustion engine in a third embodiment are basically similar to the exhaust purification system of the internal combustion engine in the first embodiment except for the points explained below. For this reason, below, the third embodiment of the present invention will be explained focusing on the parts different from the first embodiment.

In the third embodiment, the air-fuel ratio control device switches the target air-fuel ratio from the lean set air-fuel ratio to the rich set air-fuel ratio when the output air-fuel ratio of the downstream side air-fuel ratio sensor 41 reaches the first lean judged air-fuel ratio. Further, the air-fuel ratio control device switches the target air-fuel ratio from the rich set air-fuel ratio to the lean set air-fuel ratio when judging that the estimated amount of change of the oxygen storage amount of the upstream side catalyst 20 when the target air-fuel ratio is maintained at the rich set air-fuel ratio reaches the switching storage amount. Due to this, in the present embodiment, the oxygen storage amount of the upstream side catalyst 20 can be made to fluctuate between the value of the maximum oxygen storage amount minus the switching storage amount and the maximum oxygen storage amount.

The lean set air-fuel ratio and the first lean judged air-fuel ratio are preset and are air-fuel ratios leaner than the stoichiometric air-fuel ratio. Further, the lean set air-fuel ratio is leaner than the first lean judged air-fuel ratio. That is, the lean degree of the lean set air-fuel ratio is larger than the lean degree of the first lean judged air-fuel ratio. Further, the first lean judged air-fuel ratio is set to an air-fuel ratio corresponding to the output of the downstream side air-fuel ratio sensor 41 when the oxygen storage amount of the upstream side catalyst 20 increases and the atmosphere of the upstream side catalyst 20 changes from the stoichiometric air-fuel ratio to lean.

The rich set air-fuel ratio is preset and is an air-fuel ratio richer than the stoichiometric air-fuel ratio. Further, the switching storage amount is preset and is set to a value smaller than the maximum oxygen storage amount of the upstream side catalyst 20. Note that, the air-fuel ratio control device uses a method similar to the first embodiment to calculate the estimated amount of change of the oxygen storage amount of the upstream side catalyst 20.

As explained above, at the time of acceleration or deceleration etc., of the vehicle mounting the internal combustion engine, sometimes the air-fuel ratio of the inflowing exhaust gas will temporarily deviate from the target air-fuel ratio due to an external disturbance. If the air-fuel ratio of the inflowing exhaust gas deviates to the lean side from the target air-fuel ratio, the amount of oxygen and $NO_X$ flowing into the upstream side catalyst 20 becomes greater. For this reason, when the oxygen storage amount of the upstream side catalyst 20 is close to the maximum oxygen storage amount, a large amount of $NO_X$ is liable to flow out from the upstream side catalyst 20 if the air-fuel ratio of the inflowing exhaust gas deviates to the lean side from the target air-fuel ratio.

On the other hand, when the oxygen storage amount of the upstream side catalyst 20 is sufficiently smaller than the maximum oxygen storage amount, even if the air-fuel ratio of the inflowing exhaust gas deviates to the lean side from the target air-fuel ratio, there is little possibility of the oxygen storage amount of the upstream side catalyst 20 reaching the maximum oxygen storage amount. Further, if the air-fuel ratio of the inflowing exhaust gas deviates to the lean side from the target air-fuel ratio due to an external disturbance, the output air-fuel ratio of the upstream side air-fuel ratio sensor 40 also deviates to the lean side from the target air-fuel ratio.

For this reason, in the third embodiment, if a seventh condition wherein an estimated amount of change of the oxygen storage amount of the upstream side catalyst 20 when the target air-fuel ratio is maintained at the lean set air-fuel ratio is equal to or greater than a first reference amount, and an eighth condition wherein a difference of the output air-fuel ratio of the upstream side air-fuel ratio sensor 40 and a stoichiometric air-fuel ratio is equal to or greater than a difference of a second lean judged air-fuel ratio and a stoichiometric air-fuel ratio are satisfied, the air-fuel ratio control device switches the target air-fuel ratio from the lean set air-fuel ratio to the rich set air-fuel ratio when the seventh condition and the eighth condition are satisfied. Note that, the eighth condition is satisfied when the output air-fuel ratio of the upstream side air-fuel ratio sensor 40 is the second lean judged air-fuel ratio or more.

The second lean judged air-fuel ratio is preset and is an air-fuel ratio leaner than the stoichiometric air-fuel ratio. Further, the second lean judged air-fuel ratio is leaner than the lean set air-fuel ratio. That is, the lean degree of the second lean judged air-fuel ratio is larger than the lean degree of the lean set air-fuel ratio. The first reference amount is preset and is set to a value smaller than the switching storage amount. In other words, the switching storage amount is set to a value greater than the first reference amount.

<Explanation of Air-Fuel Ratio Control Using Time Chart>

Figure 11:
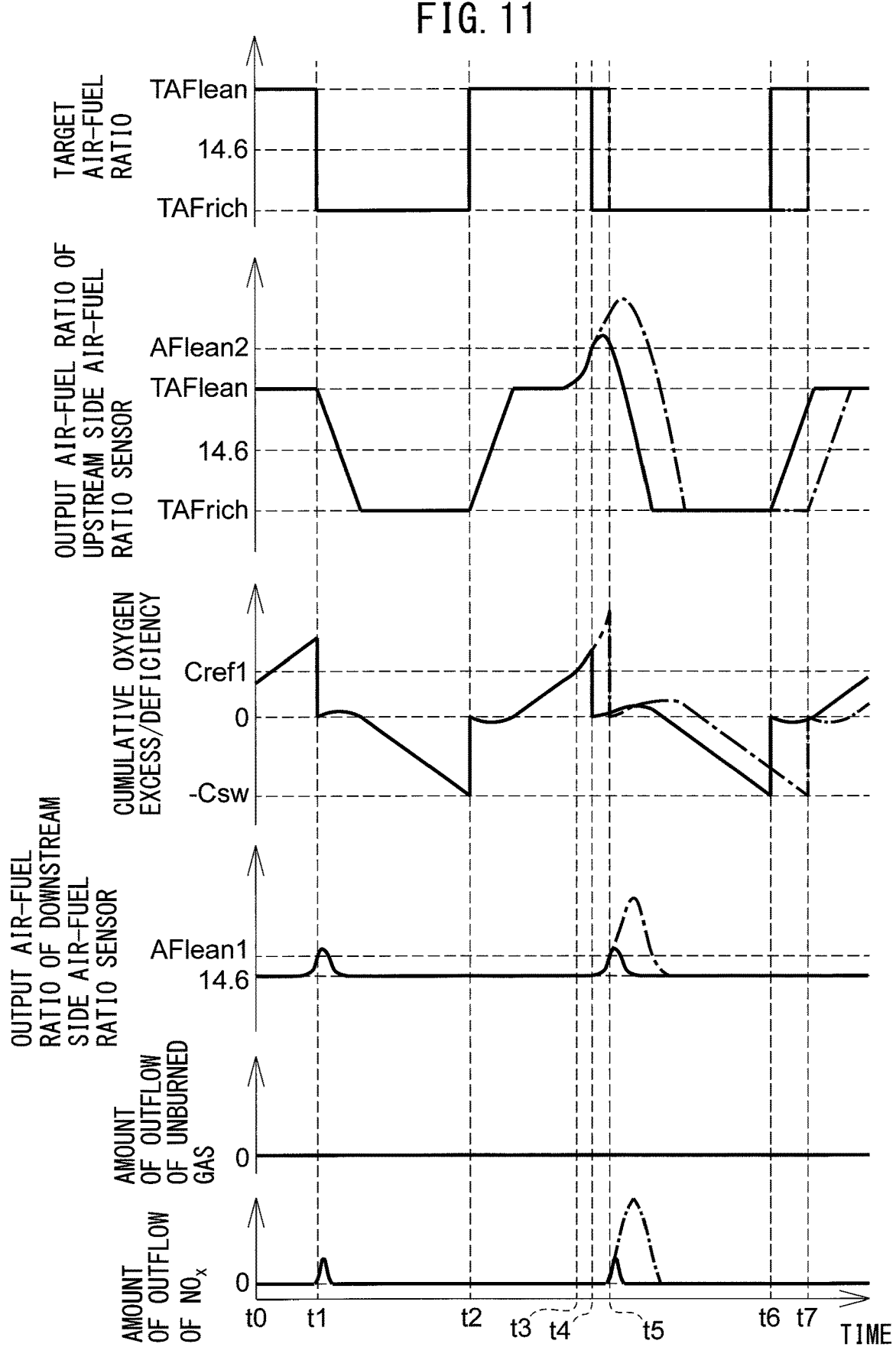
FIG. 11 is a time chart of a target air-fuel ratio of inflowing exhaust gas etc., when air-fuel ratio control in a third embodiment is performed.

Referring to FIG. 11, the air-fuel ratio control in the third embodiment will be specifically explained. FIG. 11 is a time chart of the target air-fuel ratio of the inflowing exhaust gas, the output air-fuel ratio of the upstream side air-fuel ratio sensor 40, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of unburned gas flowing out from the upstream side catalyst 20, and the amount of the $NO_X$ flowing out from the upstream side catalyst 20, when the air-fuel ratio control in the third embodiment is performed. The cumulative oxygen excess/deficiency is calculated by cumulatively adding the oxygen excess/deficiency calculated by the above formula (1) or (2). In FIG. 11, the solid line shows a time chart in the third embodiment, while the one-dot chain line shows a time chart in a comparative example of the third embodiment.

In the illustrated example, at the time t0, the target air-fuel ratio is set to the lean set air-fuel ratio TAFlean, and thus the air-fuel ratio of the inflowing exhaust gas becomes leaner than the stoichiometric air-fuel ratio. For this reason, the upstream side catalyst 20 stores excess oxygen in the inflowing exhaust gas. Note that, if no disturbance occurs in the air-fuel ratio, the output air-fuel ratio of the upstream side air-fuel ratio sensor 40 basically approximates the target air-fuel ratio.

At the time t0, the oxygen storage amount of the upstream side catalyst 20 is sufficiently smaller than the maximum oxygen storage amount, and the unburned gas and $NO_X$ in the outflowing exhaust gas are removed by the upstream side catalyst 20. For this reason, the output air-fuel ratio of the downstream side air-fuel ratio sensor 41 becomes substantially the stoichiometric air-fuel ratio.

After the time t0, when the oxygen storage amount of the upstream side catalyst 20 approaches the maximum oxygen storage amount, the output air-fuel ratio of the downstream side air-fuel ratio sensor 41 gradually rises and, at the time t1, reaches the first lean judged air-fuel ratio AFlean1. At the time t1, it is considered that the oxygen storage amount of the upstream side catalyst 20 is substantially the maximum oxygen storage amount. After the time t1, a trace amount of $NO_X$ flows out from the upstream side catalyst 20.

To make the oxygen storage amount of the upstream side catalyst 20 decrease, at the time t1, the target air-fuel ratio is switched from the lean set air-fuel ratio TAFlean to the rich set air-fuel ratio TAFrich. As a result, the output air-fuel ratio of the upstream side air-fuel ratio sensor 40 changes from the lean set air-fuel ratio TAFlean toward the rich set air-fuel ratio TAFrich. Further, at the time t1, the cumulative oxygen excess/deficiency is reset to zero.

After the time t1, the absolute value of the cumulative oxygen excess/deficiency gradually increases and at the time t2 reaches the switching storage amount Csw. For this reason, to make the oxygen storage amount of the upstream side catalyst 20 increase, at the time t2, the target air-fuel ratio is switched from the rich set air-fuel ratio TAFrich to the lean set air-fuel ratio TAFlean. Further, at the time t2, the cumulative oxygen excess/deficiency is reset to zero. Note that, at the time t2, the oxygen storage amount of the upstream side catalyst 20 does not reach zero, so almost no unburned gas flows out from the upstream side catalyst 20.

After the time t2, at the time t3, the cumulative oxygen excess/deficiency reaches the first reference amount Crefl. For this reason, at the time t3, the seventh condition is satisfied.

Further, as a result of the air-fuel ratio of the inflowing exhaust gas deviating to the lean side from the target air-fuel ratio (the lean set air-fuel ratio TAFlean) due to the effect of an external disturbance, at the time t4, the output air-fuel ratio of the upstream side air-fuel ratio sensor 40 reaches the second lean judged air-fuel ratio AFlean2. For this reason, at the time t4, the eighth condition is satisfied. Further, at this time, the cumulative oxygen excess/deficiency is greater than the first reference amount Crefl and the seventh condition remains being satisfied.

Therefore, at the time t4, the seventh condition and the eighth condition are satisfied and the target air-fuel ratio is switched from the lean set air-fuel ratio TAFlean to the rich set air-fuel ratio TAFrich. After that, at the time t5, the output air-fuel ratio of the downstream side air-fuel ratio sensor 41 reaches the first lean judged air-fuel ratio AFlean1.

On the other hand, in the comparative example shown by the one-dot chain line, at the time t5, when the output air-fuel ratio of the downstream side air-fuel ratio sensor 41 reaches the first lean judged air-fuel ratio AFlean1, the target air-fuel ratio is switched from the lean set air-fuel ratio TAFlean to the rich set air-fuel ratio TAFrich. In this case, the time period during which inflowing exhaust gas with a large lean degree flows into the upstream side catalyst 20 becomes longer and a large amount of $NO_X$ flows out from the upstream side catalyst 20.

On the other hand, in the present embodiment, the target air-fuel ratio is switched when the seventh condition and the eighth condition are satisfied before the output air-fuel ratio of the downstream side air-fuel ratio sensor 41 reaches the first lean judged air-fuel ratio AFlean1, so the amount of $NO_X$ flowing out from the upstream side catalyst 20 is suppressed. Therefore, according to the air-fuel ratio control in the present embodiment, it is possible to keep the exhaust emission from deteriorating when making the oxygen storage amount of the upstream side catalyst 20 fluctuate. Note that, the trace amount of $NO_X$ flowing out from the upstream side catalyst 20 is removed by the downstream side catalyst 24.

After that, in the present embodiment, at the time t6, the absolute value of the cumulative oxygen excess/deficiency reaches the switching storage amount Csw and the target air-fuel ratio is switched from the rich set air-fuel ratio TAFrich to the lean set air-fuel ratio TAFlean. On the other hand, in the comparative example, at the time t7, the absolute value of the cumulative oxygen excess/deficiency reaches the switching storage amount Csw and the target air-fuel ratio is switched from the rich set air-fuel ratio TAFrich to the lean set air-fuel ratio TAFlean.

<Processing for Setting Target Air-Fuel Ratio>

Below, the air-fuel ratio control in the third embodiment will be explained in detail. Note that, in the third embodiment, in the same way as the first embodiment, the block diagram of control of the air-fuel ratio control shown in FIG. 7 is used.

FIG. 12 is a flow chart showing a control routine of processing for setting the target air-fuel ratio in the third embodiment. The present control routine is repeatedly performed by the ECU 31 at predetermined time intervals after startup of the internal combustion engine.

First, at step S301, it is judged whether the rich flag Frich is zero. The rich flag Frich is set to "1" when the target air-fuel ratio TAF is set to the rich set air-fuel ratio TAFrich, while is set to "0" when the target air-fuel ratio TAF is set to the lean set air-fuel ratio TAFlean. Note that, the initial value of the rich flag Frich is set to "0" or "1".

If at step S301 it is judged that the rich flag Frich is zero, the present control routine proceeds to step S302. In this case, the target air-fuel ratio TAF is set to the lean set air-fuel ratio TAFlean. At step S302, it is judged whether the output air-fuel ratio AFdwn of the downstream side air-fuel ratio sensor 41 is equal to or larger than the first lean judged air-fuel ratio AFlean1.

If at step S302 it is judged that the output air-fuel ratio AFdwn of the downstream side air-fuel ratio sensor 41 is equal to or greater than the first lean judged air-fuel ratio AFlean1, the present control routine proceeds to step S305. At step S305, the target air-fuel ratio TAF is set to the rich set air-fuel ratio TAFrich and the rich flag Frich is set to "1". After step S305, the present control routine ends.

On the other hand, if at step S302 it is judged that the output air-fuel ratio AFdwn of the downstream side air-fuel ratio sensor 41 is less than the first lean judged air-fuel ratio AFrich1, the present control routine proceeds to step S303. At step S303, it is judged whether the cumulative oxygen excess/deficiency ΣOED is the first reference amount Crefl or more. That is, it is judged whether the seventh condition is satisfied.

The cumulative oxygen excess/deficiency ΣOED is calculated by cumulatively adding the oxygen excess/deficiency OED calculated at the above formula (1) or (2). Further, the cumulative oxygen excess/deficiency ΣOED is reset to zero when the target air-fuel ratio TAF is switched from the rich set air-fuel ratio TAFrich to the lean set air-fuel ratio TAFlean and when the target air-fuel ratio TAF is switched from the lean set air-fuel ratio TAFlean to the rich set air-fuel ratio TAFrich. Further, the first reference amount Crefl is for example set to a value of 0.5 to 0.8 time the switching storage amount Csw.

If at step S303 it is judged that the cumulative oxygen excess/deficiency ΣOED is equal to or greater than the first reference amount Crefl or more, the present control routine proceeds to step S304. At step S304, it is judged whether the output air-fuel ratio AFup of the upstream side air-fuel ratio sensor 40 is equal to or greater than the second lean judged air-fuel ratio AFlean2. That is, it is judged whether the eighth condition is satisfied.

If at step S304 it is judged that the output air-fuel ratio AFup of the upstream side air-fuel ratio sensor 40 is equal to or greater than the second lean judged air-fuel ratio AFlean2, the present control routine proceeds to step S305. At step S305, the target air-fuel ratio TAF is set to the rich set air-fuel ratio TAFrich and the rich flag Frich is set to "1". After step S305, the present control routine ends.

On the other hand, if at step S303 it is judged that the cumulative oxygen excess/deficiency ΣOED is less than the first reference amount Crefl or if at step S304 it is judged that the output air-fuel ratio AFup of the upstream side air-fuel ratio sensor 40 is less than the second lean judged air-fuel ratio AFlean2, the present control routine ends. In this case, the target air-fuel ratio TAF is maintained at the current value.

Further, if at step S301 it is judged that the rich flag Frich is "1", the present control routine proceeds to step S306. In this case, the target air-fuel ratio TAF is set to the rich set air-fuel ratio TAFrich. At step S306, it is judged whether the absolute value of the cumulative oxygen excess/deficiency ΣOED is equal to or greater than the switching storage amount Csw.

The switching storage amount Csw is, for example, set to a value smaller than the maximum oxygen storage amount of the upstream side catalyst 20 in the unused state (for example, a value of 0.2 to 0.8 time the maximum oxygen storage amount). Note that, the switching storage amount Csw may be set to a value smaller than the upstream side catalyst 20 calculated by a known means (for example, a value of 0.2 to 0.8 time the maximum oxygen storage amount).

If at step S306 it is judged that the absolute value of the cumulative oxygen excess/deficiency ΣOED is the switching storage amount Csw or more, the present control routine proceeds to step S307. At step S307, the target air-fuel ratio TAF is set to the lean set air-fuel ratio TAFlean and the rich flag Frich is set to zero. After step S307, the present control routine ends.

On the other hand, if at step S306 it is judged that the absolute value of the cumulative oxygen excess/deficiency ΣOED is less than the switching storage amount Csw, the present control routine ends. In this case, the target air-fuel ratio TAF is maintained at the current value.

As clear from the above explanation, in the first embodiment, second embodiment, and third embodiment, the following such air-fuel ratio control is performed.

The air-fuel ratio control device sets the target air-fuel ratio to the first set air-fuel ratio and then, when the output air-fuel ratio of the downstream side air-fuel ratio sensor 41 reaches the first judged air-fuel ratio, switches the target air-fuel ratio from the first set air-fuel ratio to the second set air-fuel ratio. The first set air-fuel ratio and the first judged air-fuel ratio are air-fuel ratios in the first region richer or leaner than the stoichiometric air-fuel ratio. Further, the difference of the first set air-fuel ratio and the stoichiometric air-fuel ratio is larger than the difference of the first judged air-fuel ratio and the stoichiometric air-fuel ratio. Further, the second set air-fuel ratio is an air-fuel ratio in the second region at the opposite side from the first region across the stoichiometric air-fuel ratio.

Further, if a first judged condition wherein an estimated amount of change of the oxygen storage amount of the upstream side catalyst 20 when the target air-fuel ratio is maintained at the first set air-fuel ratio is equal to or larger than a first reference amount, and a second judged condition wherein a difference of the output air-fuel ratio of the upstream side air-fuel ratio sensor 40 and a stoichiometric air-fuel ratio is equal to or greater than a difference of a second judged air-fuel ratio and a stoichiometric air-fuel ratio are satisfied, the air-fuel ratio control device switches the target air-fuel ratio from the first set air-fuel ratio to the second set air-fuel ratio when the first judged condition and the second judged condition are satisfied.

Further, in the first embodiment, the air-fuel ratio control device switches the target air-fuel ratio from the second set air-fuel ratio to the first set air-fuel ratio when the output air-fuel ratio of the downstream side air-fuel ratio sensor 41 reaches the third judged air-fuel ratio. Furthermore, if a third judged condition wherein an estimated amount of change of the oxygen storage amount of the upstream side catalyst 20 when the target air-fuel ratio is maintained at the second set air-fuel ratio is equal to or greater than the second reference amount, and a fourth judged condition wherein a difference of the output air-fuel ratio of the upstream side air-fuel ratio sensor 40 and the stoichiometric air-fuel ratio is equal to or greater than a difference of the fourth judged air-fuel ratio and a stoichiometric air-fuel ratio are satisfied, the air-fuel ratio control device switches the target air-fuel ratio from the second set air-fuel ratio to the first set air-fuel ratio when the third judged condition and the fourth judged condition are satisfied.

The second reference amount is smaller than the maximum oxygen storage amount of the upstream side catalyst 20, the fourth judged air-fuel ratio is an air-fuel ratio in the second region, and the difference of the fourth judged air-fuel ratio and the stoichiometric air-fuel ratio is larger than the difference of the second set air-fuel ratio and the stoichiometric air-fuel ratio.

If the air-fuel ratio in the first region is an air-fuel ratio richer than the stoichiometric air-fuel ratio, the first set air-fuel ratio and the second set air-fuel ratio respectively correspond to the rich set air-fuel ratio and the lean set air-fuel ratio in the first embodiment. Further, the first judged air-fuel ratio, second judged air-fuel ratio, third judged air-fuel ratio, and fourth judged air-fuel ratio respectively correspond to the first rich judged air-fuel ratio, second rich judged air-fuel ratio, first lean judged air-fuel ratio, and second lean judged air-fuel ratio in the first embodiment. Further, the first reference amount and the second reference amount correspond to the rich side reference amount and lean side reference amount in the first embodiment. Further, the first judged condition, second judged condition, third judged condition, and fourth judged condition respectively correspond to the first condition, second condition, third condition, and fourth condition in the first embodiment.

Further, if the air-fuel ratio in the first region is an air-fuel ratio leaner than the stoichiometric air-fuel ratio, the first set air-fuel ratio and the second set air-fuel ratio respectively correspond to the lean set air-fuel ratio and the rich set air-fuel ratio in the first embodiment. Further, the first judged air-fuel ratio, second judged air-fuel ratio, third judged air-fuel ratio, and fourth judged air-fuel ratio respectively correspond to the first lean judged air-fuel ratio, second lean judged air-fuel ratio, first rich judged air-fuel ratio, and second rich judged air-fuel ratio in the first embodiment. Further, the first reference amount and the second reference amount correspond to the lean side reference amount and rich side reference amount in the first embodiment. Further, the first judged condition, second judged condition, third judged condition, and fourth judged condition respectively correspond to the third condition, fourth condition, first condition, and second condition in the first embodiment.

Further, in the second embodiment and the third embodiment, the air-fuel ratio control device switches the target air-fuel ratio from the second set air-fuel ratio to the first set air-fuel ratio when the estimated amount of change of the oxygen storage amount of the upstream side catalyst 20 when the target air-fuel ratio is maintained at the second set air-fuel ratio reaches the switching storage amount. The switching storage amount is smaller than the maximum oxygen storage amount of the upstream side catalyst 20 and larger than the first reference amount.

In the second embodiment, the air-fuel ratio in the first region is an air-fuel ratio richer than the stoichiometric air-fuel ratio. The first set air-fuel ratio and the second set air-fuel ratio respectively correspond to the rich set air-fuel ratio and the lean set air-fuel ratio in the second embodiment. Further, the first judged air-fuel ratio and the second judged air-fuel ratio respectively correspond to the first rich judged air-fuel ratio and the second rich judged air-fuel ratio in the second embodiment. Further, the first judged condition and the second judged condition respectively correspond to the fifth condition and the sixth condition in the second embodiment.

In the third embodiment, the air-fuel ratio in the first region is an air-fuel ratio leaner than the stoichiometric air-fuel ratio. The first set air-fuel ratio and the second set air-fuel ratio respectively correspond to the lean set air-fuel ratio and the rich set air-fuel ratio in the third embodiment. Further, the first judged air-fuel ratio and the second judged air-fuel ratio respectively correspond to the first lean judged air-fuel ratio and the second lean judged air-fuel ratio in third embodiment. Further, the first judged condition and the second judged condition respectively correspond to the seventh condition and eighth condition in the third embodiment.

Above, preferred embodiments according to the present invention were explained, but the present invention is not limited to these embodiments and can be modified and changed in various ways within the language of the claims. For example, the harmful substances in exhaust gas are basically removed by the upstream side catalyst 20, so the downstream side catalyst 24 may be omitted from the exhaust purification system.

REFERENCE SIGNS LIST

20. upstream side catalyst
31. ECU
40. upstream side air-fuel ratio sensor
41. downstream side air-fuel ratio sensor

The invention claimed is:

1. An exhaust purification system of an internal combustion engine comprising:
   a catalyst arranged in an exhaust passage and able to store oxygen;
   an upstream side air-fuel ratio sensor arranged at an upstream side of the catalyst in a direction of flow of exhaust and detecting an air-fuel ratio of inflowing exhaust gas flowing into the catalyst;
   a downstream side air-fuel ratio sensor arranged at a downstream side of the catalyst in the direction of flow of exhaust and detecting an air-fuel ratio of outflowing exhaust gas flowing out from the catalyst; and
   an air-fuel ratio control device configured to control an air-fuel ratio of the inflowing exhaust gas to a target air-fuel ratio, wherein
   the air-fuel ratio control device is configured to set the target air-fuel ratio to a first set air-fuel ratio, then, when the air-fuel ratio detected by the downstream side air-fuel ratio sensor reaches a first judged air-fuel ratio, switch the target air-fuel ratio from the first set air-fuel ratio to a second set air-fuel ratio,
   the first set air-fuel ratio and the first judged air-fuel ratio are air-fuel ratios in a first region richer or leaner than a stoichiometric air-fuel ratio, a difference of the first set air-fuel ratio and stoichiometric air-fuel ratio is larger than a difference of the first judged air-fuel ratio and stoichiometric air-fuel ratio, and the second set air-fuel ratio is an air-fuel ratio in a second region at an opposite side to the first region across the stoichiometric air-fuel ratio,
   if a first judged condition wherein an estimated amount of change of an oxygen storage amount of the catalyst when the target air-fuel ratio is maintained at the first set air-fuel ratio is equal to or greater than a first reference amount, and a second judged condition wherein a difference of an air-fuel ratio detected by the upstream side air-fuel ratio sensor and a stoichiometric air-fuel ratio is equal to or greater than a difference of a second judged air-fuel ratio and a stoichiometric air-fuel ratio are satisfied, the air-fuel ratio control device is configured to switch the target air-fuel ratio from the first set air-fuel ratio to the second set air-fuel ratio when the first judged condition and second judged condition are satisfied, and
   the first reference amount is smaller than a maximum oxygen storage amount of the catalyst, the second judged air-fuel ratio is an air-fuel ratio in the first region, and a difference of the second judged air-fuel ratio and the stoichiometric air-fuel ratio is larger than a difference of the first set air-fuel ratio and the stoichiometric air-fuel ratio.

2. The exhaust purification system of the internal combustion engine according to claim 1, wherein
   the air-fuel ratio control device is configured to switch the target air-fuel ratio from the second set air-fuel ratio to the first set air-fuel ratio when the air-fuel ratio detected by the downstream side air-fuel ratio sensor reaches a third judged air-fuel ratio, and
   if a third judged condition wherein the estimated amount of change of the oxygen storage amount of the catalyst when the target air-fuel ratio is maintained at the second set air-fuel ratio is equal to or greater than a second reference amount, and a fourth judged condition wherein a difference of the air-fuel ratio detected by the upstream side air-fuel ratio sensor and the stoichiometric air-fuel ratio is equal to or greater than a difference of the fourth judged air-fuel ratio and the stoichiometric air-fuel ratio are satisfied, the air-fuel ratio control device is configured to switch the target air-fuel ratio from the second set air-fuel ratio to the first set air-fuel ratio when the third judged condition and the fourth judged condition are satisfied, and
   the second reference amount is smaller than a maximum oxygen storage amount of the catalyst, the fourth judged air-fuel ratio is an air-fuel ratio in the second region, and a difference of the fourth judged air-fuel ratio and a stoichiometric air-fuel ratio is larger than a difference of the second set air-fuel ratio and the stoichiometric air-fuel ratio.

3. The exhaust purification system of the internal combustion engine according to claim 1, wherein
the air-fuel ratio control device is configured to switch the target air-fuel ratio from the second set air-fuel ratio to the first set air-fuel ratio when the estimated amount of change of the oxygen storage amount of the catalyst when the target air-fuel ratio is maintained at the second set air-fuel ratio reaches a switching storage amount and
the switching storage amount is smaller than of a maximum oxygen storage amount of the catalyst and larger than the first reference amount.

4. The exhaust purification system of the internal combustion engine according to claim 1, wherein the air-fuel ratio control device is configured to control by feedback an amount of fuel supplied to a combustion chamber so that the air-fuel ratio detected by the upstream side air-fuel ratio sensor matches the target air-fuel ratio, and calculate the estimated amount of change of the oxygen storage amount of the catalyst based on the air-fuel ratio detected by the upstream side air-fuel ratio sensor.

5. The exhaust purification system of the internal combustion engine according to claim 2, wherein the air-fuel ratio control device is configured to control by feedback an amount of fuel supplied to a combustion chamber so that the air-fuel ratio detected by the upstream side air-fuel ratio sensor matches the target air-fuel ratio, and calculate the estimated amount of change of the oxygen storage amount of the catalyst based on the air-fuel ratio detected by the upstream side air-fuel ratio sensor.

6. The exhaust purification system of the internal combustion engine according to claim 3, wherein the air-fuel ratio control device is configured to control by feedback an amount of fuel supplied to a combustion chamber so that the air-fuel ratio detected by the upstream side air-fuel ratio sensor matches the target air-fuel ratio, and calculate the estimated amount of change of the oxygen storage amount of the catalyst based on the air-fuel ratio detected by the upstream side air-fuel ratio sensor.

\* \* \* \* \*